United States Patent
Hofmann et al.

(10) Patent No.: US 6,841,067 B1
(45) Date of Patent: Jan. 11, 2005

(54) FILTRATION DEVICE FOR LIQUIDS

(75) Inventors: Uwe Hofmann, Heidenrod (DE); Detlev Weyrauch, Kleinmaischeid (DE); Ernst Reder, Hahnheim (DE)

(73) Assignee: Brita GmbH, Taunusstein (DE)

( * ) Notice: Subject to any disclaimer, the term of this patent is extended or adjusted under 35 U.S.C. 154(b) by 89 days.

(21) Appl. No.: 10/129,026

(22) PCT Filed: Nov. 2, 2000

(86) PCT No.: PCT/DE00/03857
§ 371 (c)(1),
(2), (4) Date: Aug. 6, 2002

(87) PCT Pub. No.: WO01/32560
PCT Pub. Date: May 10, 2001

(30) Foreign Application Priority Data
Nov. 2, 1999 (DE) .......................................... 199 52 757

(51) Int. Cl.⁷ ............................................... B01D 27/02
(52) U.S. Cl. ...................... 210/266; 210/282; 210/291; 210/289; 210/470
(58) Field of Search .............................. 210/266, 282, 210/291, 289, 470

(56) References Cited

U.S. PATENT DOCUMENTS

| | | | | | |
|---|---|---|---|---|---|
| 4,378,293 A | * | 3/1983 | Duke | .......................... | 210/282 |
| 5,427,683 A | * | 6/1995 | Gershon et al. | ............. | 210/264 |
| 5,505,120 A | * | 4/1996 | Albertson | ..................... | 99/286 |
| 5,980,743 A | * | 11/1999 | Bairischer | ................... | 210/266 |
| 6,638,426 B1 | * | 10/2003 | Fritter et al. | ................. | 210/266 |

* cited by examiner

Primary Examiner—Minh-Chau T. Pham
(74) Attorney, Agent, or Firm—Dinsmore & Shohl LLP

(57) ABSTRACT

A filtration device for liquids is provided and includes a filtration beaker filled with a filtration material and a lid. The lid is connected to the filtration beaker in a liquid-tight manner to define an inner volume, and includes at least one liquid inlet and at least one air vent. A sieve-like textile fabric is disposed in between the filtration beaker and the lid. In order to guarantee secure operation and ensure a good retaining effect with respect to particles having a size of approximately 200 micrometers at different filtration-material fill heights in the filtration beaker, the sieve-like textile fabric has at least one formed part protruding into the inner volume of the lid, whereby air can be found on both sides of the part of the textile fabric which is located farthest away from the filtration beaker.

25 Claims, 18 Drawing Sheets

FILTRATION DEVICE FOR LIQUIDS

Figure 1:
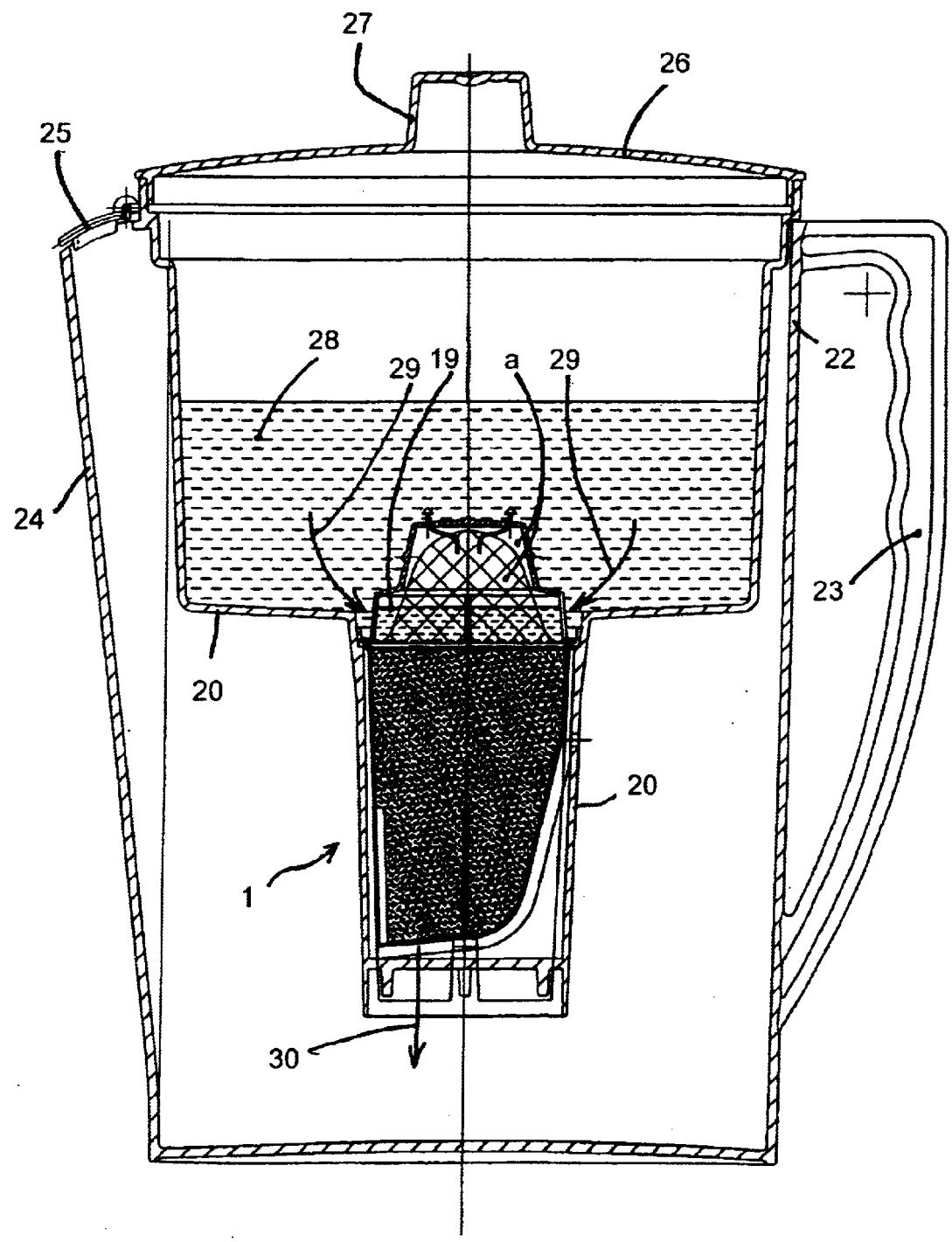

The invention relates to a filtration device for liquids with a filtration beaker which is filled with filtration material and the base of which has at least one sieve-like outlet opening for the liquid, and with a lid which predetermines an inner volume and is provided with at least one inlet opening for the liquid and one venting opening for escaping air and is connected to the filtration beaker in a liquid-tight manner, a sieve-like, textile fabric being arranged between the filtration beaker and the lid.

In a second embodiment, the invention furthermore relates to a filtration device for liquids with a filtration chamber with an inner volume ($V_i$) which is at least partly filled with filtration material and has at least one inlet and outlet opening for the liquid, a sieve-like formed body being arranged between the inlet and outlet opening such that, together with the walls of the filtration chamber, it forms a volume $V_u$ in which the filtration material is located.

The filtration device described above is known. It is used for filtering water, an ion exchanger and/or active charcoal being used as the filtration material. The known filtration device has the form of a cartridge, the longitudinal central axis of which is preferably arranged vertically such that the lid is at the top and the base of the filtration beaker is at the bottom and the liquid, preferably the water to be filtered, flows in at the top into the lid and leaves the filtration beaker at the bottom at the base. The liquid, preferably the water to be filtered, flows in at the top into the inlet opening and leaves the filtration chamber through the outlet openings at the bottom at the base. The known filtration device is inserted into a funnel provided for this in a water purification device, which is mounted on a trapping or collection container for filtered liquid and is preferably closed at the top with a removable lid. The user introduces, for example, tap water into the funnel at the top, which, after passing through the filtration device, can be used in the collection container for preparation of food, preferably tea, or the like.

For filtering or also water treatment which is as effective as possible, it is desirable to provide the liquid entering through the filtration device, which is preferably water, with the largest possible surface of filtration material, or to force the liquid to undergo an absorption activity which is as intensive and extensive as possible. As is known, in the case of granules as the filtration material, a larger active surface is obtained the smaller the size of the individual filtration particles. It is possible for particles of about 200 $\mu$m and smaller to be present in the filtration material. The active surface made available to the liquid to be filtered which is flowing through is thus satisfactorily large. However, this advantage is associated with the disadvantage that some of these tiny granule particles pass through the inlet openings in the lid and, if no particular measures are taken at the base, through the outlet openings in the base and therefore emerge from the filtration device. The particles which then in some cases float on the surface of the liquid, for example black active charcoal particles, are a nuisance to the user and are undesirable.

There is already flat sieve woven fabric of low pore size of, for example, 200 $\mu$m which have been injection-moulded from plastic, and attempts have been made experimentally with this to attach them to the upper side and under-side of the filtration beaker or filtration chamber to retain the filtration material. There have been difficulties here, to an extent which has not yet been explained, in the flow of the liquid with this type of sieve.

Compared with earlier devices, the filtration device described above for liquids has already provided a sieve-like, textile fabric between the filtration beaker and the lid, so that even small granule particles of, for example, about 200 $\mu$m in width cannot emerge through the inlet openings in the lid. Measures at the base are not taken into consideration here, for which reason the improvements and new measures are directed at and relate to only the openings in the lid. In a preferred embodiment example, a woven fabric insert was used as the sieve-like, textile fabric in the known filtration device of the type described above, and this should protrude into the filtration beaker. In one embodiment, the known woven fabric component is curved and therefore protrudes a distance downwards into the filtration beaker in the perpendicular direction. The decisive improvement of the retention capacity due to the use of the textile fabric in the known filtration device and a good flow has always been ensured if the textile fabric is in contact with the filtration material. There have adversely been problems if this contact between the textile fabric on the one hand and the filtration material in the filtration beaker on the other hand no longer existed.

Through the upper edge of a filtration beaker, it can be imagined that a plane lies, along which the lid is closed with the filtration beaker in a liquid-tight manner. It had been recognized that it was not possible to solve the flow problems if a flat textile fabric is arranged between the filtration beaker and lid approximately in the region of this imagined plane. This was explained by the fact that a column of liquid which is not all that high stands above the lid immersed in the liquid to be filtered, so that the pressure of the liquid due to the force of gravity is not all that high. Furthermore, the surface tension of a liquid is known, which has an adverse effect, especially with small sieve pores, to the extent that the slightest counter-pressure of air underneath the lid is sufficient even to block the flow of liquid. In woven fabric technology, the closing of pores with a film of moisture is called "sail formation". It has not been possible to provide a remedy here by using a flat textile fabric, for which reason in the known filtration device of the type mentioned above the textile fabric protrudes out of the plane mentioned downwards into the filtration beaker or projects out in the direction of the filtration material.

Many problems have thus already been solved. If the filtration beaker is filled with filtration material "almost to the edge", i.e. to the extent of 85% or up to 95%, this protruding fabric component will have contact with the filtration material and as a result will break the surface tension at this point, with the consequence that the liquid starts to flow here, any air cushion under the lid is forced out and any counter-pressure against the pressure of the column of liquid will therefore be reduced considerably and finally eliminated. The liquid to be filtered can flow through the filtration material without problems, and the small particles of the filtration material are retained in an outstanding manner.

In cases where the filtration material dries out, the level thereof in the filtration beaker falls from the top downwards, with the consequence that the contact with the fabric component which is curved downwards is absent and the known filtration device therefore does not function. In mass production of known filtration devices, it also happens that metering of the filtration material in the filtration beaker takes place with tolerances. In a number of cases the contact between the fabric and filtration material is then also absent. If too much material is introduced into the filtration beaker, such a high expansion can take place with hard water that the filtration cartridge comprising the filtration beaker and lid bursts. If too little filtration material is introduced, the desired contact with the textile fabric is jeopardized. Furthermore, problem-free operation of the filtration device is desirable, regardless of the fill height of the filtration material.

The invention is therefore based on the object of further developing the filtration device of the abovementioned type such that a) while maintaining the retention action of the textile fabric for particles with a size of about 200 μm, b) also at different fill heights of the filtration beaker with filtration material, slowing down of the flow of liquid through the filtration material is eliminated, so that problem-free flooding and ventilation is ensured, and c) in particular at low fill levels, reliable operation is ensured.

"Reliable operation" means problem-free flooding and ventilation.

In a first embodiment, this object is achieved according to the invention in that the sieve-like, textile fabric has at least one formed part protruding into the inner volume of the lid such that during the predominant part of operation, air is present on both sides of the part of the textile fabric located the furthest away from the filtration beaker. The invention thus offers a doctrine which runs counter to the measures to date of the filtration device known above. In particular, the textile fabric should protrude upwards into the lid or into the inner volume thereof with at least a certain proportion. This formed part of the sieve-like, textile fabric should thus protrude upwards into the lid out of the plane mentioned between the filtration beaker and lid.

According to the doctrine, the extent of this protrusion should be chosen such that there is a passage from air to air at the top in the region of the highest point of the fabric. The filtration device according to the invention is gravity-driven. As is the case with the known filtration devices, liquid to be purified, for example water, is introduced at the top into a funnel above the filtration device constructed as a cartridge, the water flows through the filtration material in the filtration beaker of the filtration cartridge downwards through the column of water above this (weight, gravity) and emerges at the bottom into a collecting jug. The longitudinal direction of the collecting jug, the cartridge, the filtration beaker, the lid and also the funnel in general lies approximately in the vertical in the gravity-driven filtration device. However, the filtration device also ensures problem-free operation if this axis and the entire device is held on a slant, the axis mentioned then being arranged at an angle to the vertical or to the perpendicular. In all cases, the part of the textile fabric located the furthest away from the filtration beaker is "at the top", the highest point or the upper point or region of the textile fabric in the lid also being referred to in order to illustrate the construction, shape and operation of the filtration device. In contrast to the gravity-driven device, there is also that driven by the force of pressure, which is not considered in more detail here.

If air is thus present, for example in the form of an air cushion, at the part of the textile fabric in the lid, and on both sides thereof, i.e. inside the fabric and outside the fabric (but in both cases inside the lid), escape of air with elimination of the air cushion is surprisingly avoided by the pressure equilibrium of liquid and air established. Rather, a passage from air inside the fabric to air outside the fabric is present at the furthest at the top, i.e. at the part for emerging air located the furthest away from the filtration beaker underneath. This measure applies regardless of the height of the liquid outside the lid. If venting is thus necessary at the start, the air emerges without problems through this air/air passage upwards, until the equilibrium mentioned has been established, the air space at the top underneath the upper wall of the lid has become relatively small and ventilation is no longer additionally necessary for the flow of liquid to be purified from the top downwards. The filtration device then also functions without problems if, exceptionally, liquid has flowed over the upper part of the fabric. It has been found that these circumstances also apply to various levels of fill of the filtration beaker with filtration material. This applies to filtration devices of various constructions, but in particular to the same outer geometry of the conventional domestic filtration device with different heights of filtration material. Problem-free functioning of the new filtration device is thus ensured in a much higher number of cases than in the known cases, regardless of how high the fill level is in the filtration beaker, whether the filtration agent has dried out or whether the filtration beaker has even been "overfilled" beyond the abovementioned plane between the filtration beaker and lid by swelling. The filtration and sieve operation function without problems if the textile fabric is used in the construction and arrangement according to the invention, even if the textile fabric is not in contact with the filtration material. If the part of the textile fabric located away, which extends upwards into the beaker, is large enough, and if the lid is also large enough, any increase in volume of the filtration material caused by swelling is accommodated without harmful pressures arising.

The lids of known filtration devices already, and all the more so those according to the first embodiment of the invention, are constructed large enough for their inner volume to be about 30% of the volume of the filtration beaker. However, only additional volumes of about 10% are usually required to accommodate filtration material which swells. It is therefore sufficient if the inner volume provided by the formed part protruding into the lid is greater than or equal to about 5% of the volume of the filtration material in the filtration beaker.

According to the first embodiment of the invention, it is advantageous if the part of the fabric located away at the top in the lid and the venting opening are arranged above the highest end of the inlet opening. To understand this measure, a horizontal plane is again imagined between the filtration beaker at the top and the lid at the bottom, a new horizontal plane running through the highest end of the highest inlet opening and parallel to the horizontal plane between the filtration beaker and lid. If it is then ensured that the upper part of the fabric lies above this new plane, particularly reliable operation manifests itself, i.e. the liquid to be purified flows without problems through the inlet openings downwards, while air, which is displaced as a result, can flow out upwards without problems. It should also be ensured here that the venting openings lie above this imagined horizontal plane. These measures in turn promote the air/air passage at the upper part of the fabric to ensure problem-free operation both during filling, during the main operation and towards the end of the filtration operation, when the untreated water flows slowly out of the funnel. These measures apply to one and to several inlet openings in the lid, and also apply to different constructions of inlet openings, for example those which extend in a slit-like manner vertically from the lower edge of the lid upwards.

A favourable form of lid has a lower region approximately in the shape of a cylindrical jacket (with a small slant in the shape of a truncated cone) in which some inlet openings, for example four openings, are arranged on the circumference at a distance from one another. To this lower larger volume region of the lid, the external circumference of which is about the same as that of the external circumference of the filtration beaker, it is connected upwards, in a ring-shaped manner, a transition surface in the shape of a truncated cone which is connected to the far circumferential edge of an inverted beaker part of the lid. In this beaker part of the lid, the base thereof forms the "upper wall of the lid", which comprises at least one venting opening, preferably two venting openings at a distance for the escaping air.

According to the first embodiment of the invention, it is expedient if the formed part of the textile fabric protruding into the inner volume of the lid is at least partly curved. The textile fabric can have the shape of a bell, a dome, a hemisphere, a cone section etc. However, the shape of the textile fabric can also have corners, points and edges, so that the formed part protruding into the lid can be cubic, pyramidal, parallelepipedal or the like. By these measures, the textile fabric is constructed inexpensively and without problems industrially without: expensive holders, such as, for example, rings or ribs injection-moulded in. Production becomes obviously easier and less expensive by avoiding additional injection moulds.

In an advantageous further development of the first embodiment of the invention, the protruding formed part of the textile fabric has the shape of the spherical cap and is fixed in the lower, outer region on the upper edge of the filtration beaker and on the lower edge of the lid. It is preferably welded on. The spherical cap is not to be seen strictly mathematically/geometrically, but the textile fabric preferably has a calotte shape, that is to say the shape of a spherical cap, in the upper region and can be shaped outwards in the lower region. Regions in the shape of truncated cones can be connected. The textile formed part can also protrude with a plane, an edge or a point in to the lid. Fixing the fabric to the lower edge of the lid ensures that the space filled with the filtration material, which space is predominantly in the region of the filtration beaker but can also extend into the lid to a greater or lesser degree due to the circumstances described above, is encapsulated, enclosed completely by side walls and sieves. The pores of the sieve-like, textile fabric are small enough to prevent even relatively small particles from emerging outside this "sieve space". Liquid can likewise flow in and/or out through the textile fabric.

According to the first embodiment of the invention, it is furthermore favourable if the textile fabric is a woven fabric, knitted fabric, nonwoven or shaped part of plastic, and if the pore size of the fabric is preferably in the range from 50 µm to 300 µm, and preferably 80 µm to 200 µm. The textile fabric can be produced from various materials, preferably from plastic. Threads of plastic can be used here, or the entire formed body can be shaped. For example, such a textile fabric can be produced by thermoforming a polyester plastic. According to the invention, any structure of the textile fabric is conceivable. After production of the fabric, this initially has the same structure and also approximately the same pore size over its entire area. In the re-shaping of, for example, a flat textile fabric, according to the doctrine of this invention it should be ensured that the structure does not change substantially, that is to say the textile fabric is not extended or distorted more than 20 to 30%. On the other hand, slight angular shifts are permissible, such as arise, for example, on transition from a square to a parallelogram. Folding is also permissible in this context, because this is often unavoidable when shaping an initially flat fabric to forms with edges and corners. It should merely be ensured that in addition to the edges and corners, the structure of the fabric has not changed substantially, i.e. more than 20 or 30%, for example the pore size has not increased to this extent. The sieve effect of the textile fabric should thus also be retained after the shaping. The textile fabric also should not acquire such a small pore size over the entire area that passage of the liquid is at risk.

It is furthermore expedient if, in the first embodiment according to the invention, the ratio of the fluid cross-sections areas A:B:C:D is approximately equal to 1:2:10:20, with a tolerance of about ±50%, where:

A=the free total passage cross-section of the venting openings in the lid;

B=the free total passage cross-section of the inlet openings for the liquid in the lid;

C=the projected, total, free passage cross-section, which serves for venting, of the pores of the part of the fabric at the top in the lid; and D=the free, total passage cross-section for liquid through the pores of the ring-shaped lower jacket part of the fabric.

A particularly suitable embodiment of the invention uses a filtration device, the filtration beaker of which has a volume of 140 ml. If the lid described above by way of example with the widened lower part and the narrower upper part in the form of the inverted beaker is now placed on such a beaker, the inlet openings for liquid being arranged in the widened lower part and the venting openings for escaping air being arranged in the upper base of the lid, in a specific preferred embodiment A=24 mm$^2$
B=66 mm$^2$
C=300 mm$^2$ and
D=680 mm$^2$.

The free cross-section A is composed by adding up two venting openings in the lid. The free cross-section B is composed of four inlet openings for the liquid in the lower wider region of the lid. In the case of the projected free flow cross-section C for air in the upper part of the fabric, an arithmetic mean of the open filtration area of the fabric of approx. 42.5% has been taken. There is a span of between about 30% to about 65% here.

For the area D, i.e. the free passage area for the liquid in the lower region of the textile fabric with the larger diameter, an arithmetic mean of the open filtration area of the fabric of approx. 42.5% has been assumed. A span of between about 30% to about 65% also applies here.

If these ratios which are the doctrine according to the invention or the individual ratios, for example A:B=1:2 etc., are adhered to, ventilation without problems on the one hand and flow of liquid on the other hand are ensured. The size ratios stated for the pores of the textile fabric allow flow problems to be avoided, whereby very effective filtration materials with large active areas (small particles) can be used without it having to be feared that small particles would trickle out of or flush through the openings.

It may be advantageous in production terms to connect the lid non-detachably to the textile fabric after shaping thereof. Thus, for example, an injection moulder can injection mould the lid, shape the textile fabric and join, for example weld, these two components to one another in a liquid-tight manner. This intermediate product (lid with textile fabric) can then be delivered to the filling plant, where it is available in magazines and is grasped by an automatic closing unit, in order then to be mounted on the filled filtration beaker and connected to this. Neither a machine nor the staff of the manufacturer then has to deal with individual woven fabric inserts and transport and arrange these with particular care. The lid in any case must be positioned correctly for closing the filtration insert, and if the textile fabric is connected non-detachably to this, no particular assembling step is additionally necessary.

According to the first embodiment of the invention, it is furthermore advantageous if the part of the fabric located away at the top in the lid is arranged at a distance from the upper wall of the lid. The formation of an air space under the upper wall of the lid can be achieved particularly readily in this manner. A distance between the said part of the fabric on the one hand and the inner surface of the upper wall of the lid on the other hand is 2 mm in a preferred embodiment example. There is then on the one hand a maximum swelling space for the filtration material in the textile fabric, and at the same time the part of the fabric located away at the top in the lid is kept dry, so that a passage from air to air exists there.

According to the invention, the inner volume provided by the textile fabric can also be made greater than or equal to 5% of the fill volume of the filtration material. It has already been stated that if the filtration beaker is filled 100% with filtration material, swelling of the volume by about 10% can take place in the event of moistening. The volume of about 10% of the filtration material can develop in the space of the textile fabric above that plane, and extend there, which has been determined above as a horizontal imagined plane at the lower edge of the lid. The filtration beaker is not usually filled 100% with filtration material, and certainly also not solely with the swellable ion exchanger. At any rate, there is an adequate swelling space for filtration material. The data envisaged according to the invention are therefore proposed for guaranteed reliable operation. An impairment of the water flow compared with known filtration devices is advantageously eliminated by this means.

It is furthermore favourable if, according to the invention, the part of the fabric located away at the top in the lid has hydrophobic or hydrophobized material at least in the upper region. A textile fabric produced, for example, from polyester has hydrophilic properties, that is to say has a certain affinity for the liquid, preferably water. Such a content would have to be hydrophobized. By the measure according to the invention, of providing the upper part of the fabric with a hydrophobic or hydrophobized content, after wetting and after drawing off of the liquid the meshes or pores of the textile fabric remain open. The hydrophobic content ensures the water-repellent property of this part of the textile fabric. The hydrophobic content should be provided in the region where the passage from air to air inside the lid is required. In general, this is the part of the fabric at the top in the lid which is located the furthest away from the filtration beaker. In the abovementioned specific and preferred embodiment with the free passage cross-section for the venting C=300 mm$^2$, for example, this area C could be hydrophobized. Providing an area of such of a size with a hydrophobic content serves to provide functional reliability of the filtration device.

In exceptional cases, it may be that water will touch the upper part of the textile, fabric or flow over it briefly in the initial stage of the filtration and will attempt to close the pores by means of sail formation. As a result of the hydrophobization according to the invention, the air to be removed from the filtration device passes virtually unimpeded into the water.

It is not the adjacent water but the sails in the pores of the textile fabric which impede the air in flowing through into the neighbouring medium (water and/or air).

If in a further advantageous development of the first embodiment of the invention the lower part of the textile fabric is provided with hydrophilic parts in the region of the inlet openings for passage of the liquid, this evidently promotes the flow of the liquid to be filtered. In this lower region, in addition to the inlet openings for the liquid, the textile fabric can also be treated with substances through which the fabric becomes more hydrophilic. These substances can be liquids by which the surface of the plastic is influenced.

The use of a web-like, flat, textile fabric for reshaping for the formation of an intrinsically stable structure part protruding into the lid and for fixing to the lid of a filtration device for liquids is furthermore of particular advantage according to the invention. It is advantageous to choose a textile fabric which is intrinsically stable or dimensionally stable. Such a fabric with the desired pore size is plastically deformable. A dome-shaped or bell-shaped curvature in such a textile fabric is then held by itself. The particular shape chosen in each case, for example also a parallelepiped, remains on the whole stable in this form. This dimensional stability can be influenced by the thickness of the threads used to produce the fabric, by the amount of threads, by the type of linking and by the material of the threads. A woven fabric which can be produced by thermoforming a plastic can also be chosen as the textile fabric. The angular stability and elongation stability of the fabric has already been referred to. If folds are formed by shaping a flat, textile fabric, for example to a parallelepiped or a bell shape, these will remain intrinsically stable, as desired, at the point where they are once incorporated.

Before this reshaping, the flat, textile formed body produced, for example, by thermoforming can be produced in the form of a sheet or a web. The textile fabric can be taken off from a roll and then reshaped into the desired shape, for example bell, parallelepiped. The pores or meshes in this textile fabric then remain after shaping without great extension or distortion. As a result, the sieve effect remains ensured.

After reshaping of the textile fabric (into the shape of a bell or a parallelepiped or the like), the fabric is cut out or stamped off to fit and welded at the circumference, for example by ultrasound, with the outer lower edge of the lid (at its free open end).

In another production process, after taking off from the rolls the textile fabric is initially held in web form, subsequently reshaped during holding, introduced into the lid in this shape during holding and then welded to the lower outer edge thereof and thereafter stamped off.

The action of the filtration device is in no way impaired by the invention. The retention action of the textile fabric for the small particles of the filtration material is maintained, and slowing down of the flow of the liquid through the filtration material if the filtration beaker is only partly filled, i.e. filled to a small degree, is then also likewise eliminated. Unexpectedly, it is no longer important for the textile fabric always to have physical contact with the filtration material in order to function. Even when contact of the textile fabric with the filtration material is absent in the filtration device according to the invention, functioning of the filtration device is nevertheless fully maintained. On the other hand, if the entire filtration beaker is filled with filtration material, so that in conventional devices the flow of the liquid would be slowed down or bursting of the apparatus could even occur due to swelling of about 10 to not more than 20%, these adverse effects are likewise eliminated by the invention.

The pressure difference (hydrostatic pressure) between the inlet openings for liquid in the lower region of the lid on the one hand and the venting openings for air in the upper wall of the lid on the other hand ensures that air always escapes at the top and the liquid flows in at the bottom and not vice versa. The air pressure in the air space at the top in the lid is always so high that the air is forced out upwards and liquid is not forced in or does not run in at the top into the venting openings.

Compared with conventional filtration devices, according to the invention the venting openings in the upper wall of the lid are chosen to be quite large. In a preferred embodiment, for example, two slit-like venting openings with a width of in each case 1.5 mm and a length of in each case 8 mm are provided. This ensures that with the pressure existing under the upper wall of the lid, the air also always emerges from these openings if liquid is fed in at the bottom.

The air can pass out through the textile fabric from the bottom upwards inside the lid if air is present on both sides of the flat, textile fabric or sail formation is avoided.

Sail formation on the upper part of the textile fabric is avoided by the hydrophobic contents. Even if liquid gets on to the meshes or pores of this upper part of the textile fabric due to tilting or for other reasons, these pores remain open after the filtration device is straightened up.

In the second embodiment of the invention, the object is achieved in that the sieve-like formed body is at least partly movable, so that it can occupy two extreme positions and intermediate positions lying in between, the volume ($V_u$) being reduced by a difference in volume $\Delta V$ on passage from the first to the second extreme position. As a result of the sieve-like formed body being arranged in a movable manner, the volume ($V_u$) in which the filtration material is located can be adapted to suit the desired requirements. Bursting of the filtration cartridge is prevented effectively by this measure, since a very marked expansion of the filtration material merely ensures that the flexible formed body occupies a position in the vicinity of the first position, so that the volume ($V_u$) in which the filtration material is located is enlarged.

The sieve-like formed body can in principle be any object which fulfils the desired sieve function and is sufficiently movable. However, a sieve-like fabric is particularly preferably used here, since it is easy to produce and can be arranged in the filtration chamber with a saving in space.

Although the fabric can in principle have any desired shape, for example it can be arranged in a completely flat manner, a preferred embodiment nevertheless provides for the area of a reference plane laid through the edge of the fabric to be smaller than the actual area of the fabric. This ensures that the fabric curves out in at least one direction beyond the reference plane. The part of the formed body of the preferably textile fabric protruding beyond the reference plane preferably has the shape of a spherical cap. The spherical cap is not to be seen strictly mathematically/geometrically, but the textile fabric preferably has a calotte shape or a rounded-off pot shape and can be shaped in a spreading-out manner in the radially outer region. Regions in the shape of truncated cones can be attached. The formed part can also protrude out of the reference plane with a plane, an edge or points. The pores of the sieve-like formed part are small enough to prevent emergence even of relatively small particles from the volume ($V_u$), the so-called "sieve space". Liquids can likewise flow in and/or out through the fabric.

The enlarged area of the fabric moreover has the advantage that the passage area for the liquids to be filtered becomes larger, so that rapid filtration becomes possible.

A preferred embodiment of the filtration device provides for the filtration chamber to have at least one venting opening for escaping air which is arranged on the same side of the sieve-like formed body as the inlet opening. Since air is usually in the filtration chamber at least at the start of the filtration operation, the venting openings mentioned ensure that this air can escape rapidly through the venting openings so that the flow is not delayed, especially at the start of the filtration operation.

Although the advantage according to the invention is at least also partly achieved by a very small difference in volume $\Delta V$, a particularly preferred embodiment nevertheless provides for the difference in volume to be at least 1%, preferably at least 5%, particularly preferably at least 10% of the fill volume of the filtration material in the filtration chamber.

The difference in volume can optionally also be chosen such that it is at least 1%, preferably at least 5%, particularly preferably at least 10% of the volume $V_u$. As a result of the minimum mobility described for the sieve-like formed body, the filtration device according to the invention functions properly even with a very widely varying fill height of the filtration material.

For example, as a result of a specific shaping of the sieve-like formed body, the abovementioned sail formation occurs to only a limited extent. In a preferred embodiment, the sail formation is avoided by the sieve-like formed body coming into contact with the appropriately established surface of the filtration material and/or another structural component in at least the second extreme position. As a result of the sieve-like formed body coming into contact with the surface of the material, the sails are broken open in the region of the contact area and the liquid can cross through the sieve formed body virtually unimpeded. It goes without saying that the contact mentioned between the sieve-like formed body on the one hand and the surface of the filtration material on the other hand can also be replaced by contact of the sieve-like formed body with a further structural component. This further structural component can be, for example, a rod which is located substantially centrally in the filtration chamber and touches the sieve-like formed body in at least the second extreme position, so that the sails at the contact points are broken open. This further structural component moreover has the advantage that even if the fill height of the filtration material is extremely low or even in the absence of the filtration material, it is ensured that the liquid sails are broken open by contact in the second extreme position of the sieve-like formed body. Since as a rule a larger contact area is achieved by contact between the sieve-like formed body and the filtration material than by contact between the sieve-like formed body and the further structural component, the structural component is preferably arranged such that it can come into contact with the sieve-like formed body only in the event of a very low filling of the filtration chamber with filtration material, and in all other cases is arranged below the fill level of the filtration material.

Another particularly preferred solution of the second embodiment of the present invention provides for the sieve-like fabric to project out of the reference plane in the opposite direction in the first extreme position to that in the second extreme position. The part of the fabric located away from the reference plane preferably does not touch the wall of the filtration chamber or lid in the first extreme position. Since as a rule during the entire filtration operation there is an air bubble or an air cushion in a part of the filtration chamber substantially located away from the filtration material, as a result of the feature described above in the first extreme position there is air on both sides of the part of the fabric located the furthest away from the reference plane. As a result of a passage from air to air forming at least in a small region of the sieve-like fabric, a sail formation is prevented effectively in this region.

The filtration device according to the invention is preferably gravity-driven, so that in the first extreme position of the formed body at least a part of the formed body is higher than the same part in the second extreme position. However, it goes without saying that the filtration device according to the invention can also be employed in a pressure-driven form. "Higher" or "lower" is understood here in respect of the direction of flow, so that the formed body moves downwards when it moves substantially in the direction of the flow direction of the liquid to be filtered.

An embodiment in which in the first extreme position the part of the fabric located away from the reference plane and the venting opening are arranged above the highest end of the inlet opening is particularly preferred. This ensures that in practice during the entire filtration operation an air cushion forms in the vicinity of the venting opening and the fabric intervenes into this in its first extreme position, so that a passage from air to air arises in at least a part of the fabric.

The textile fabric is preferably made of a woven fabric, knitted fabric, fibrewoven fabric, nonwoven or shaped part of plastic and preferably has a pore size in the range from 50 $\mu$m to 300 $\mu$m, and preferably between 80 $\mu$m and 200 $\mu$m.

As already indicated, in its first extreme position the sieve-like fabric is curved upwards, so that virtually during the entire filtration operation it intervenes at least partly into an air cushion in the region of the venting openings, so that a passage from air to air exists in the region of the highest point of the fabric. The filtration device according to the invention is preferably constructed such that the ratio of the fluid cross-section areas A:B:C:D is approximately equal to 1:2:10:20, with a tolerance of about ±50%, preferably about ±25%, where A=the free total passage cross-section of the venting openings in the filtration chamber;
B=the free total passage cross-section of the inlet openings for the liquid in the filtration chamber,
C=the free, total passage cross-section, which serves for venting, of the pores of the fabric in the first extreme position and
D=the free, total passage cross-section for liquids through the pores of the substantially ring-shaped lower portion of the fabric in the first extreme position.

A particularly suitable embodiment of the invention uses a filtration device, the filtration chamber of which has a volume of about 150 to 200 ml. The inlet openings for liquids are preferably arranged below the venting openings for escaping air in the upper base of the lid of the vacuum chamber. In a specific preferred embodiment, A is approximately 24 mm$^2$, B is approximately 66 mm$^2$, C is approximately 300 mm$^2$ and D is approximately 680 mm$^2$.

The free cross-section A is composed by adding together all the venting openings in the lid. The free cross-section B is composed of all the inlet openings for the liquid. In the case of the free flow cross-section C for air in the upper part of the fabric, an arithmetic mean of the open filtration area of the fabric of approx. 42.5% has been taken. There is a range of between about 30% to about 65% here.

For the area D, i.e. the free passage area for liquid in the lower region of the textile fabric with the larger diameter, an arithmetic mean of the open filtration area of the fabric of approx. 42.5% has been assumed. A range of between about 30% to about 65% also applies here.

If this ratio which is the doctrine according to the invention or the individual ratios, e.g. A:B=1:2 etc., are adhered to, problem-free ventilation on the one hand and flow of liquid on the other hand is ensured. The size ratios stated for the pores of the textile fabric allow flow problems to be avoided, it then being possible to use very effective filtration materials with large active areas (small particles) without it having to be feared that small particles would trickle out of or flush through the openings. As already mentioned, according to the invention it is furthermore advantageous if the part of the fabric located away at the top in the lid is arranged at a distance from the upper wall of the lid or filtration chamber in the first extreme position. The formation of an air space under the upper wall of the lid or filtration chamber can be achieved particularly readily in this manner. A distance between the said part of the fabric on the one hand and the inner surface of the upper wall of the lid on the other hand is about 2 mm in a preferred embodiment. There is then on the one hand a maximum swelling space for the filtration material in the so-called sieve space, and at the same time the part of the fabric located away in the upper region of the filtration chamber is kept dry, so that a passage from air to air exists there.

The second embodiment of the filtration device according to the invention particularly preferably has a sieve-like formed body which has hydrophilic parts. The hydrophilic parts ensure that as soon as the hydrostatic liquid pressure on the sieve-like formed body falls below a certain value complete wetting of the sieve-like formed body takes place and the abovementioned sail formation occurs. Due to the resulting pressure difference, the sieve-like formed body is preferably moved by the weight of the subsequently flowing liquid from the first extreme position in the direction of the second extreme position, until it comes into contact either with the surface of the filtration material or with an appropriate structural component. The sail formation is broken open again by the contact and the liquid can now flow out through the sieve-like formed body.

For this purpose, the sieve-like formed body is preferably made of flexible and/or elastic material. The thread thickness used for the preferably textile fabric is between 5 and 1100 $\mu$m, preferably between 10 and 60 $\mu$m.

The use of a web-like, flat, flexible and/or elastic fabric for reshaping for the formation of a sieve-like formed part, which is at least partly movable, for fixing inside a filtration chamber of a filtration device for liquids is furthermore of particular advantage according to the invention. Before this reshaping, the flat, textile structure produced e.g. by thermoforming can be produced in the form of a sheet or web. The textile fabric can be taken off from a roll and then reshaped into the desired shape, e.g. bell, parallelepiped. The pores or meshes in this textile fabric then remain after the shaping without all too large an extension or distortion. The sieve effect remains ensured as a result.

After reshaping of the textile fabric (into the shape of a bell or a parallelepiped or the like), the fabric is cut out or stamped out to fit and welded at the circumference, e.g. by ultrasound, to the outer lower edge of the lid (at its free open end).

The action of the filtration device is in no way impaired by the invention according to the second embodiment. The retention action of the textile fabric for the small particles of the filtration material is maintained, and a slowing down of the flow of liquid through the filtration device if the filtration beaker is only partly filled, i.e. filled to a small extent, is then likewise also eliminated.

Figure 2:
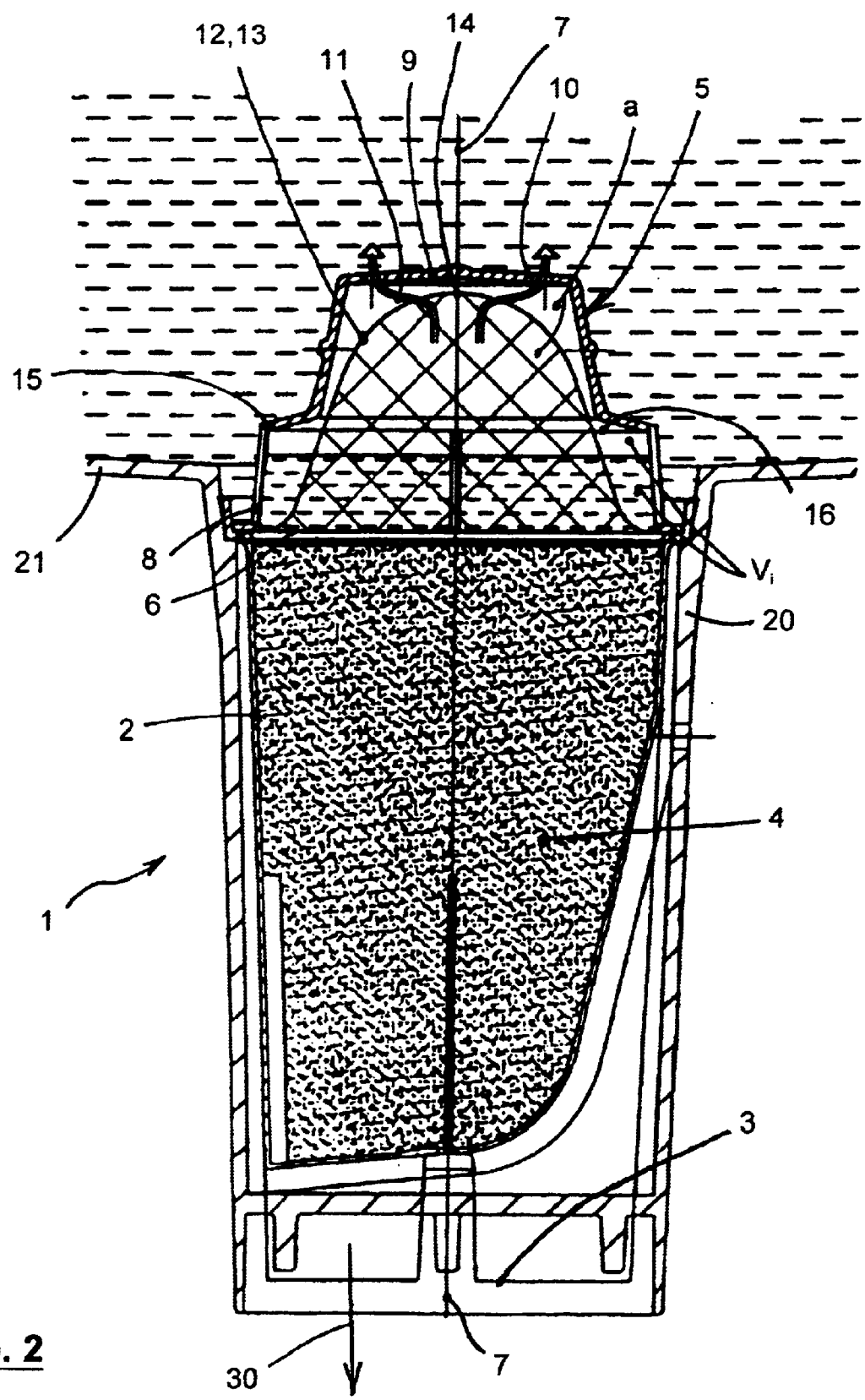
Figure 3:
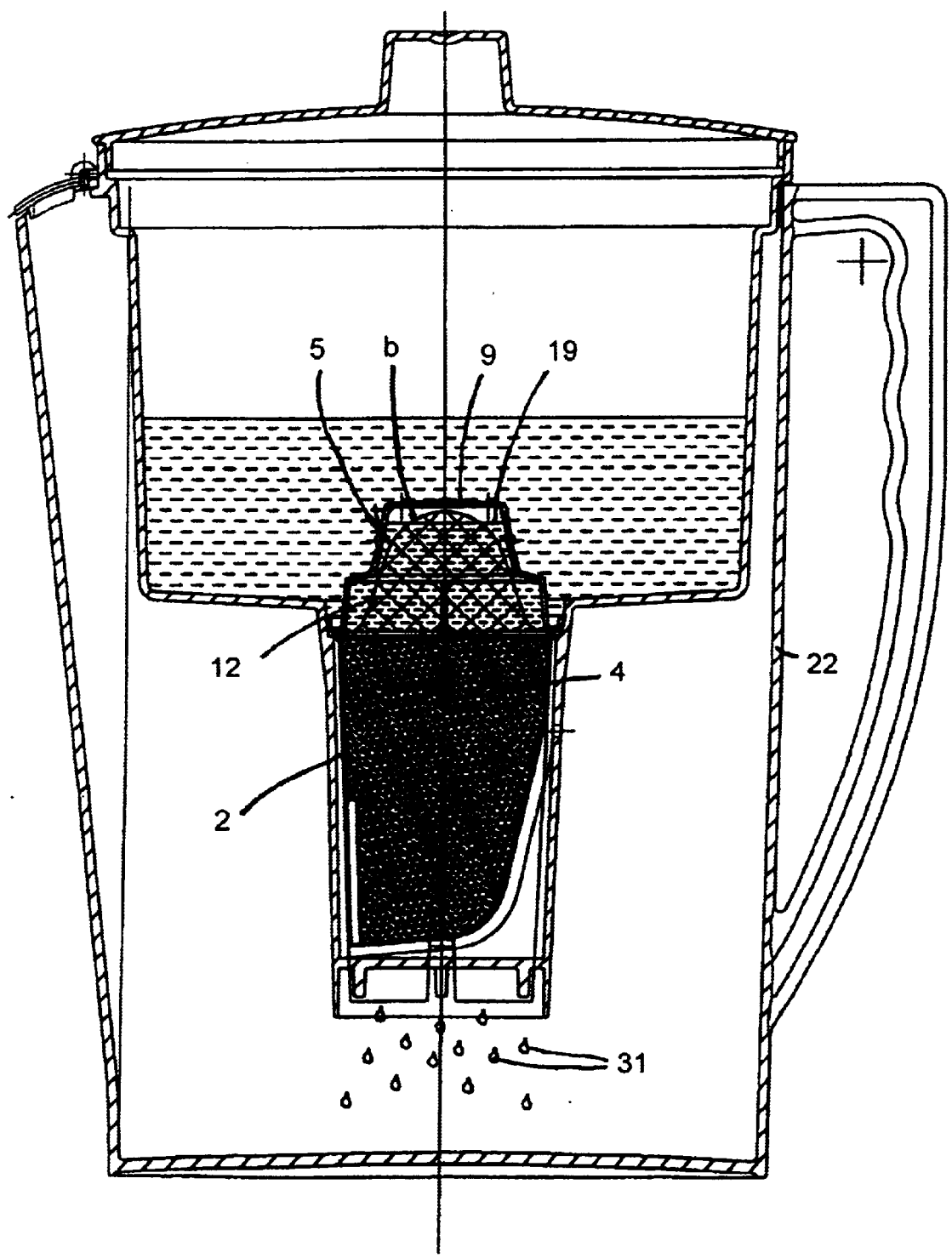
Figure 4:
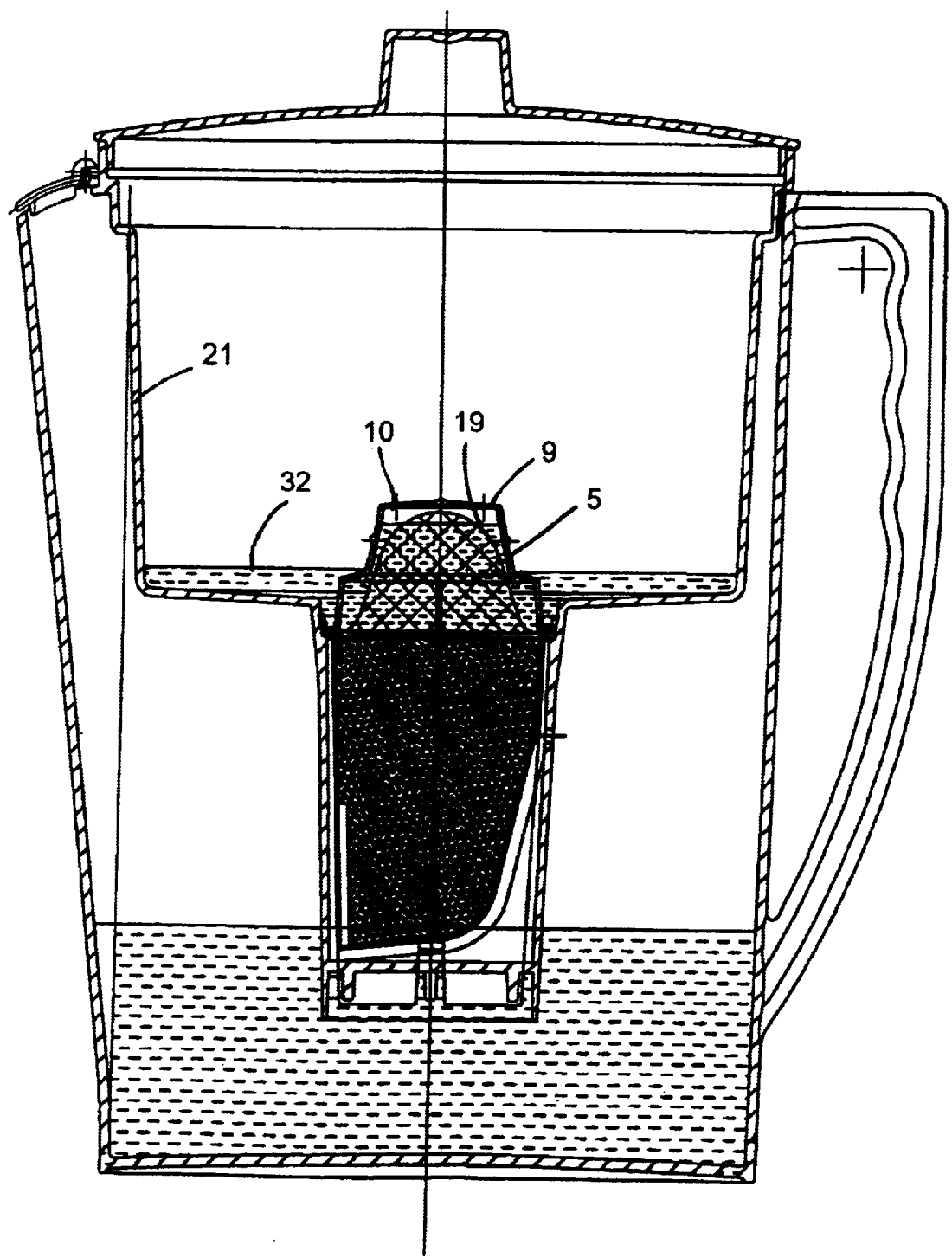
Figure 5:
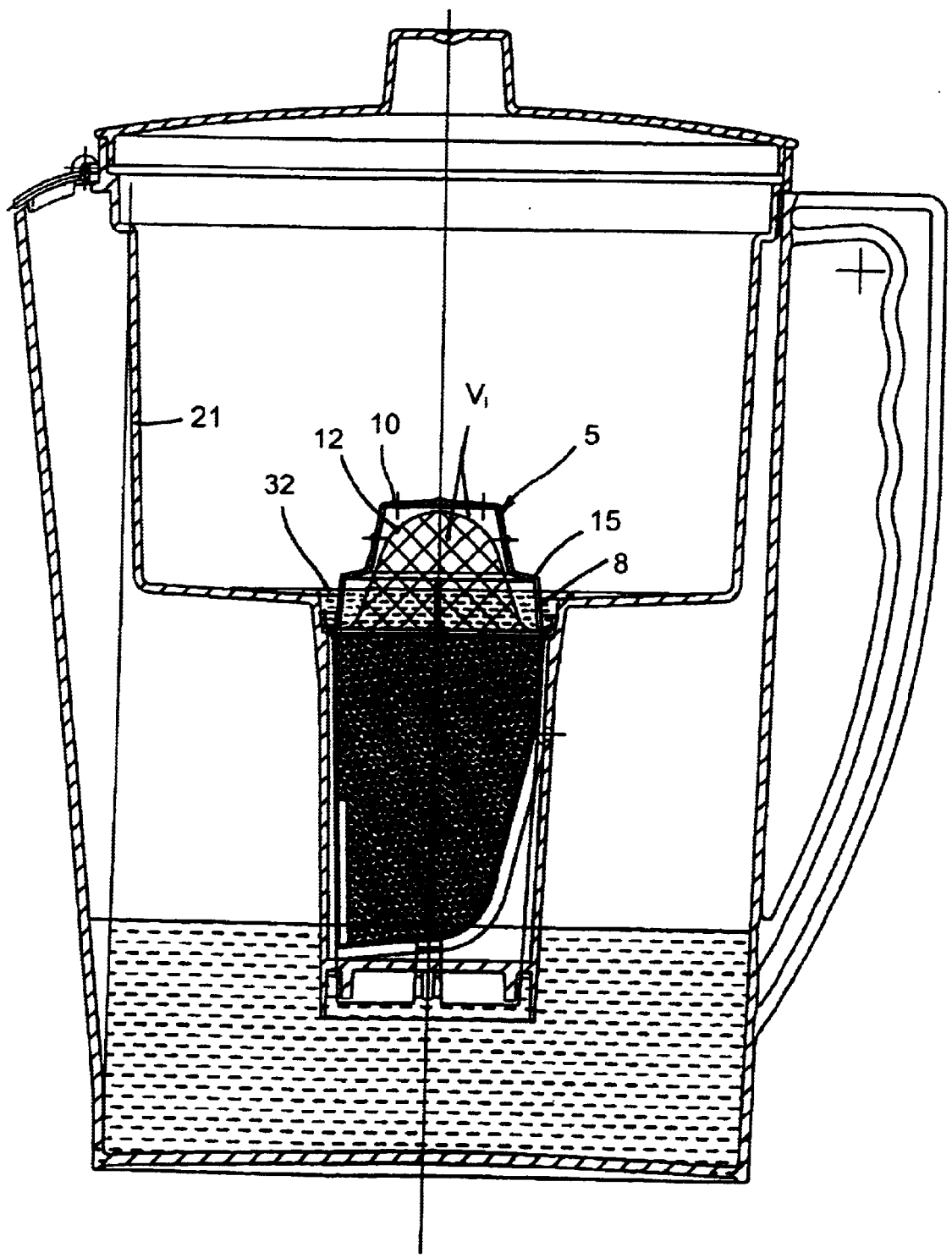
Figure 6:
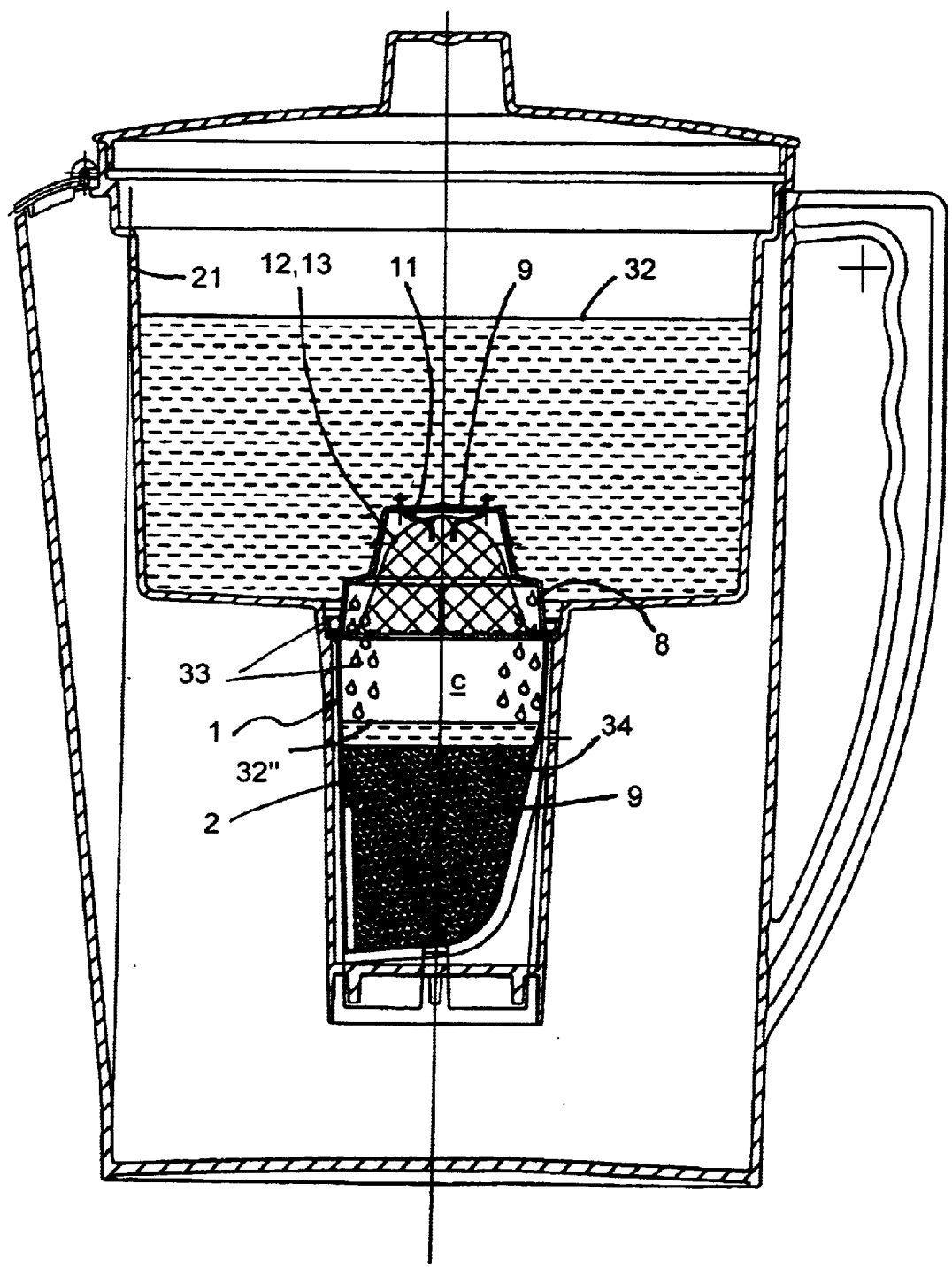
Figure 7:
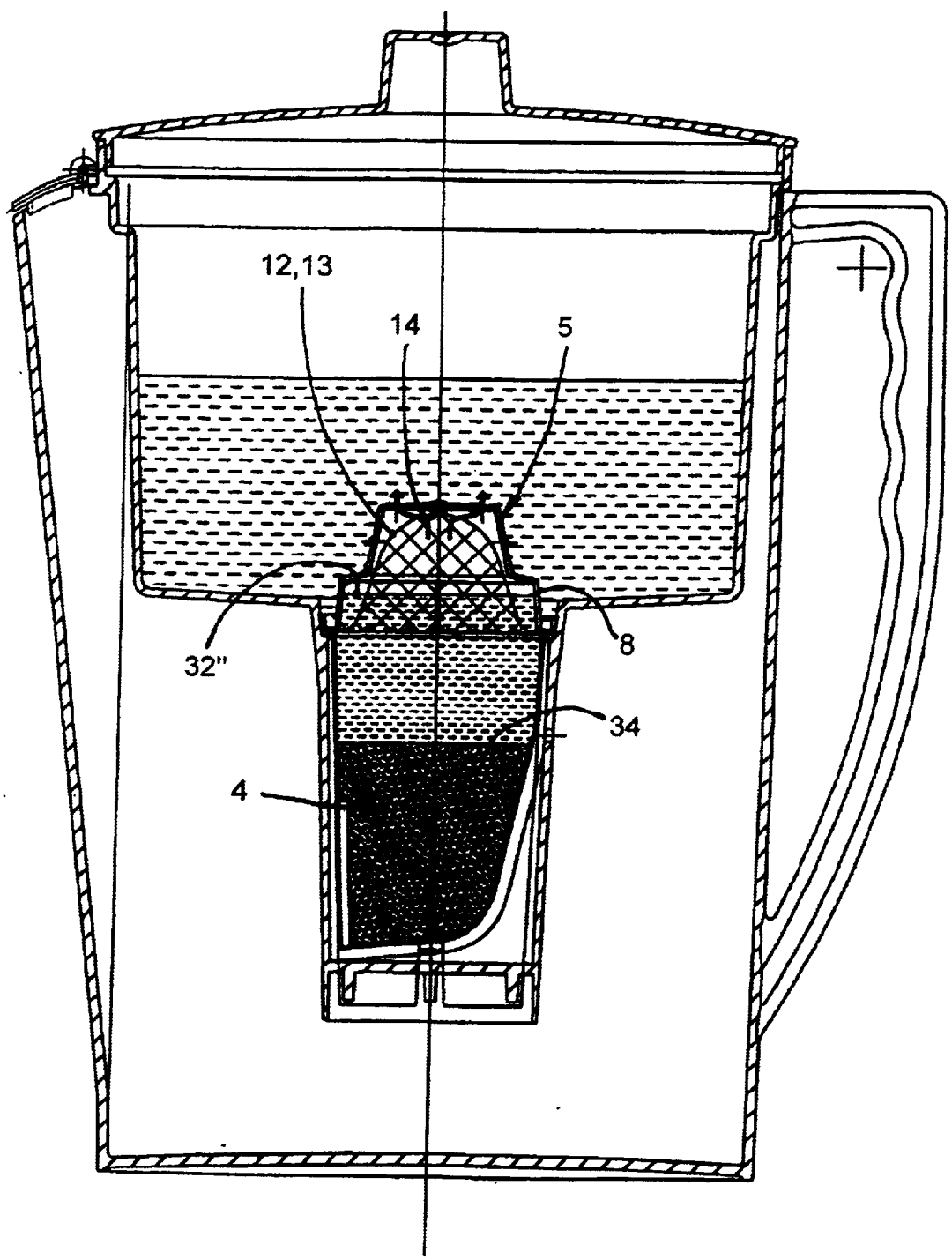
Figure 8:
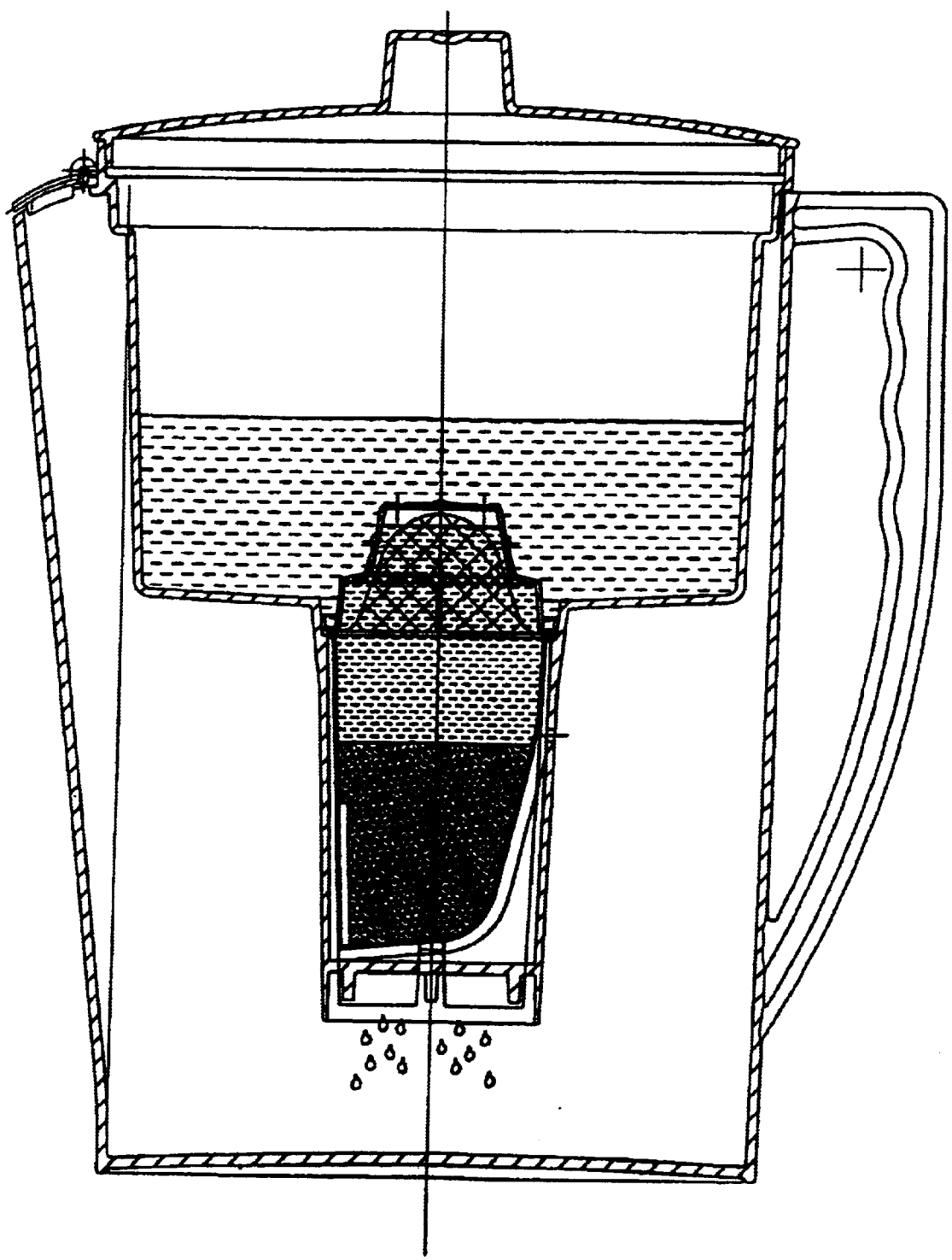
Figure 9:
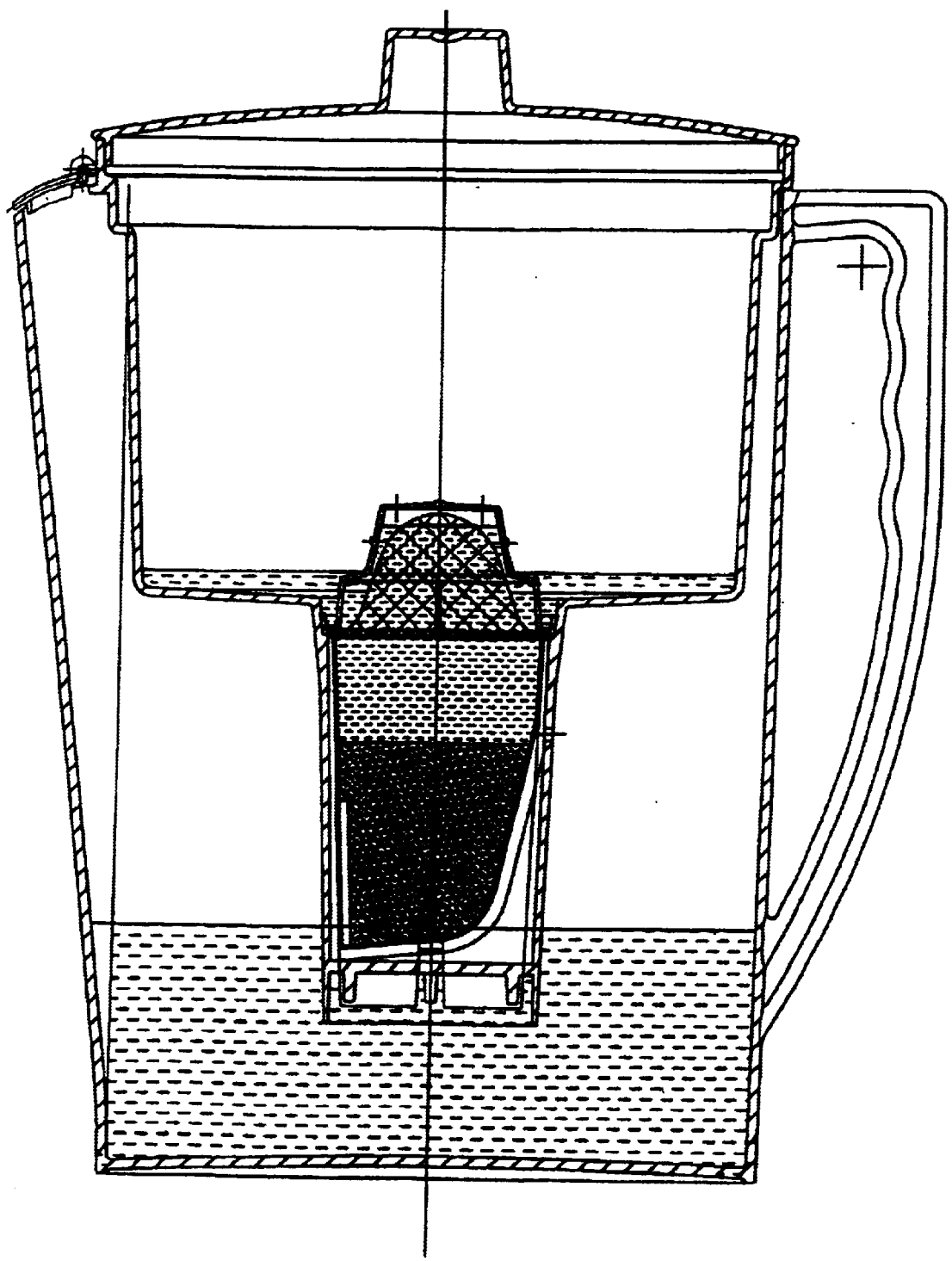
Figure 10:
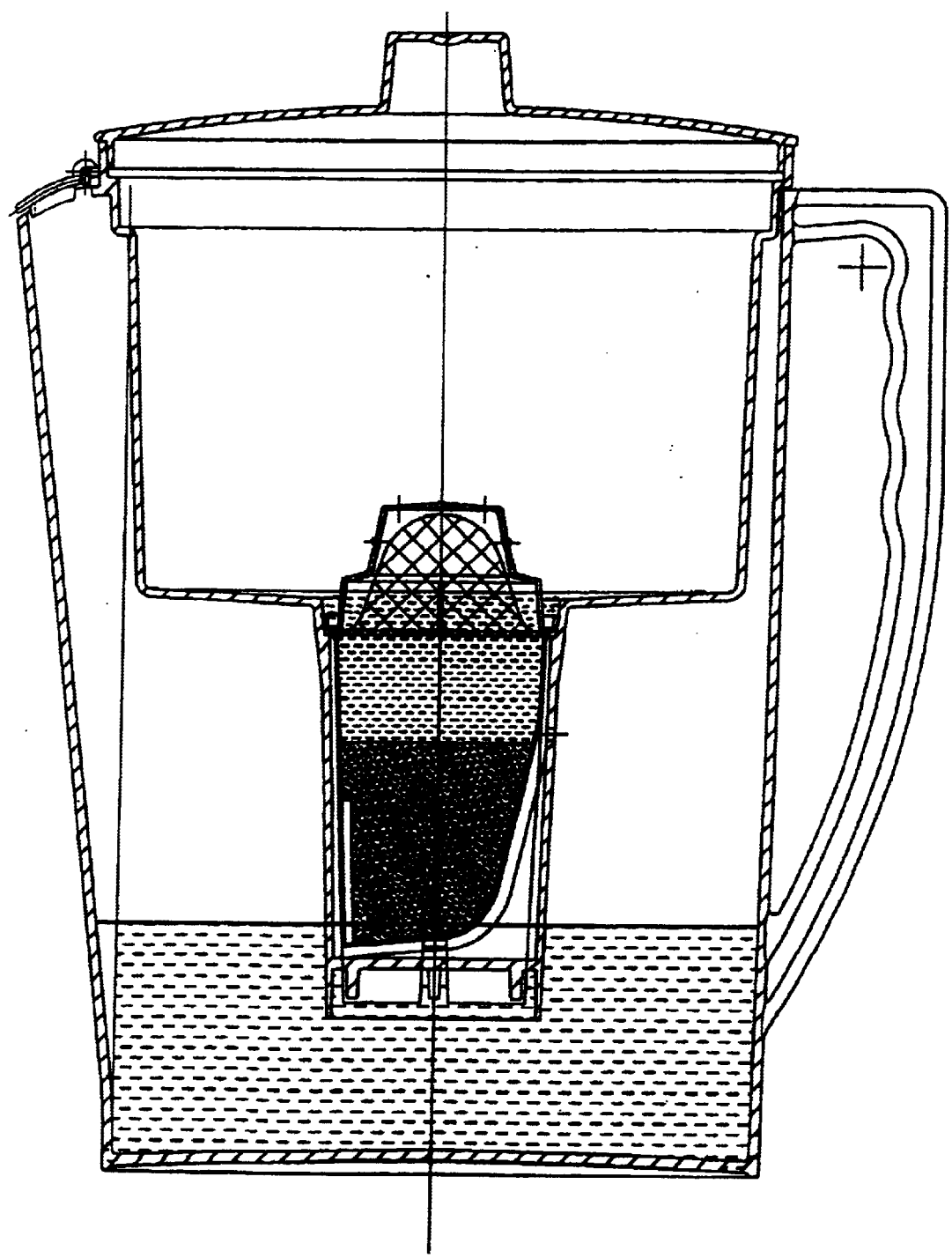
Figure 11:
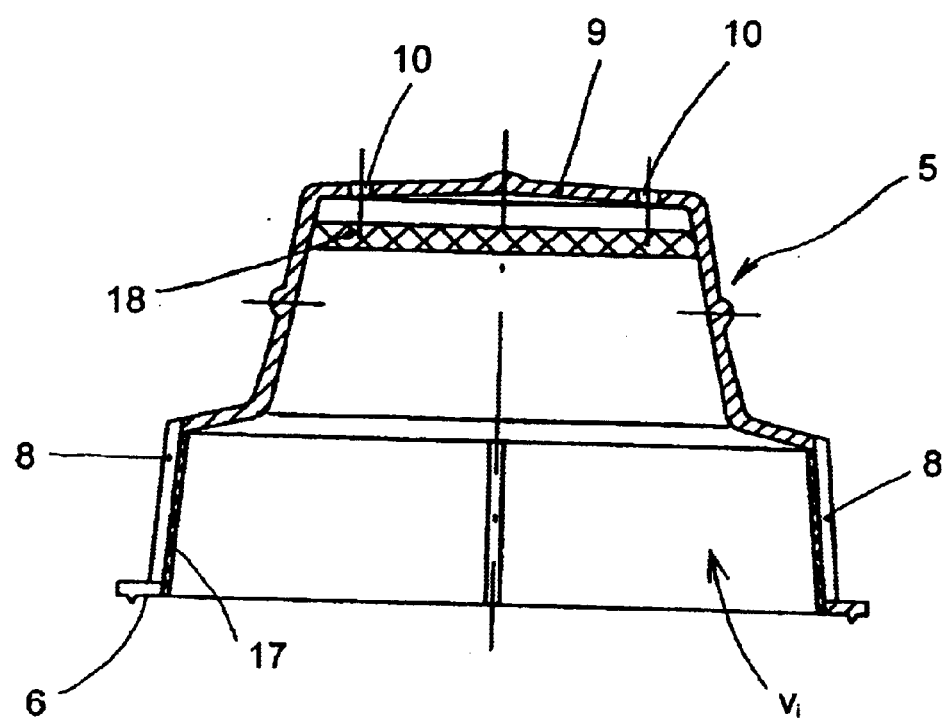
Figure 12:
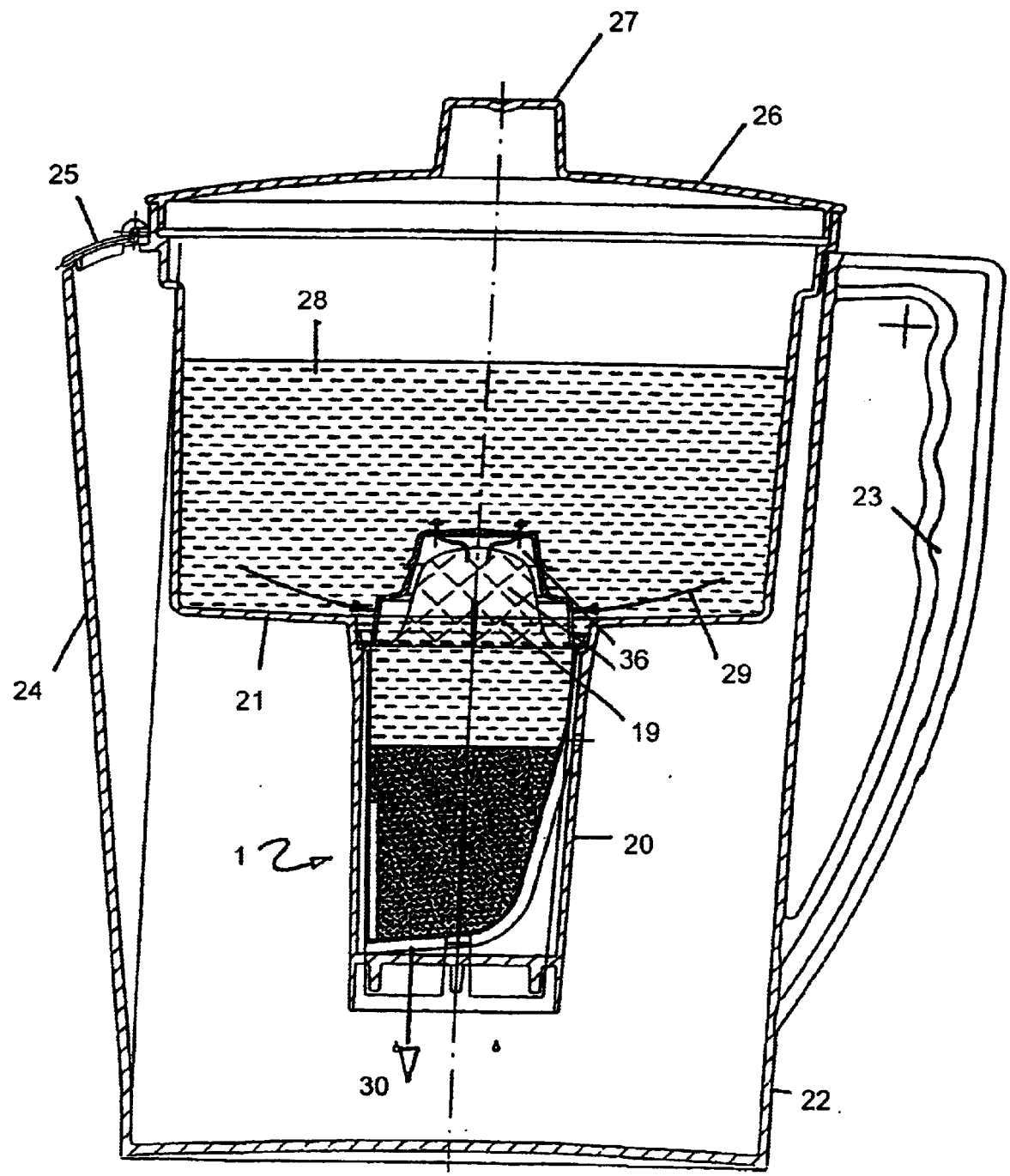
Figure 13:
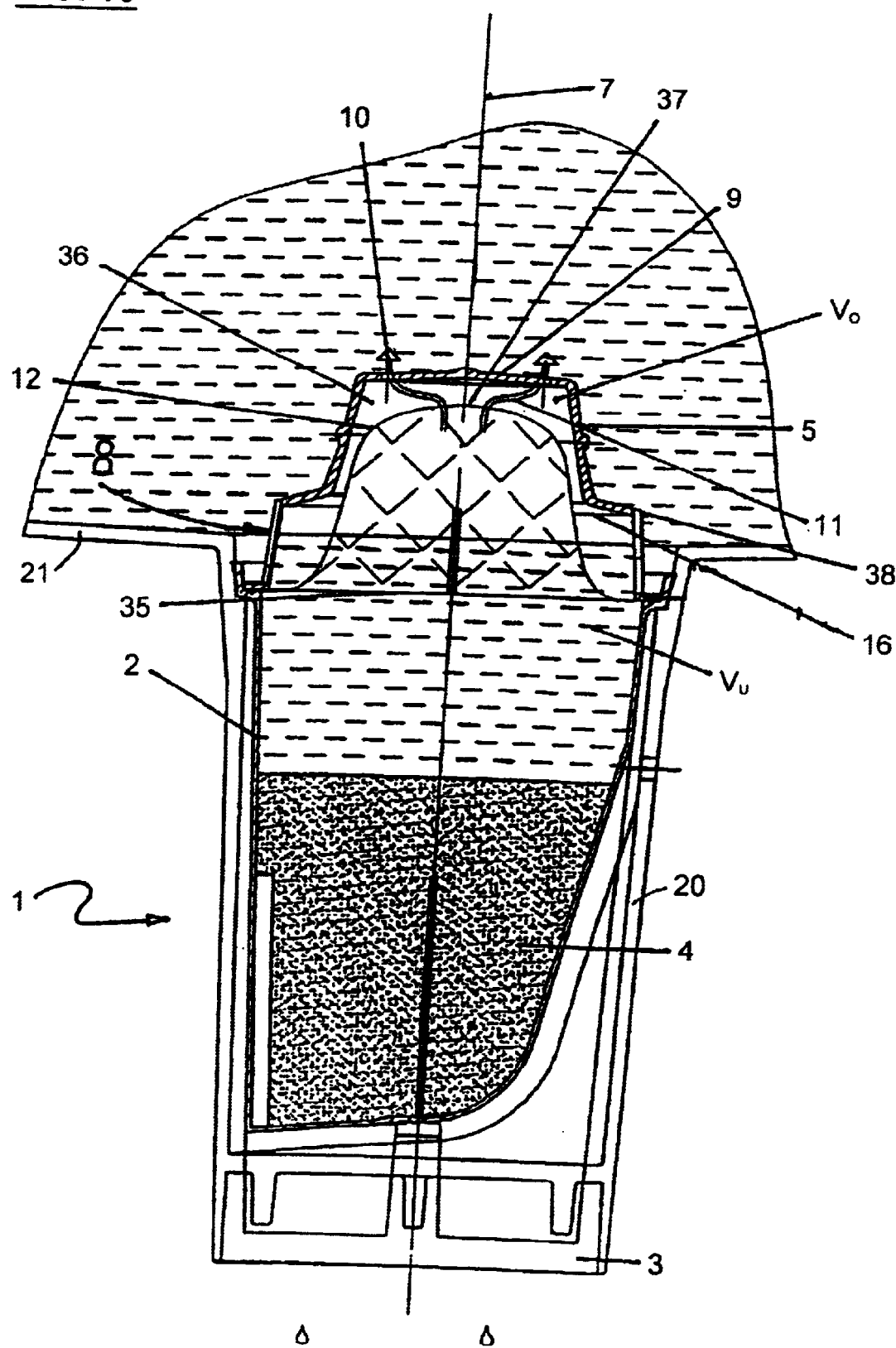
Figure 14:
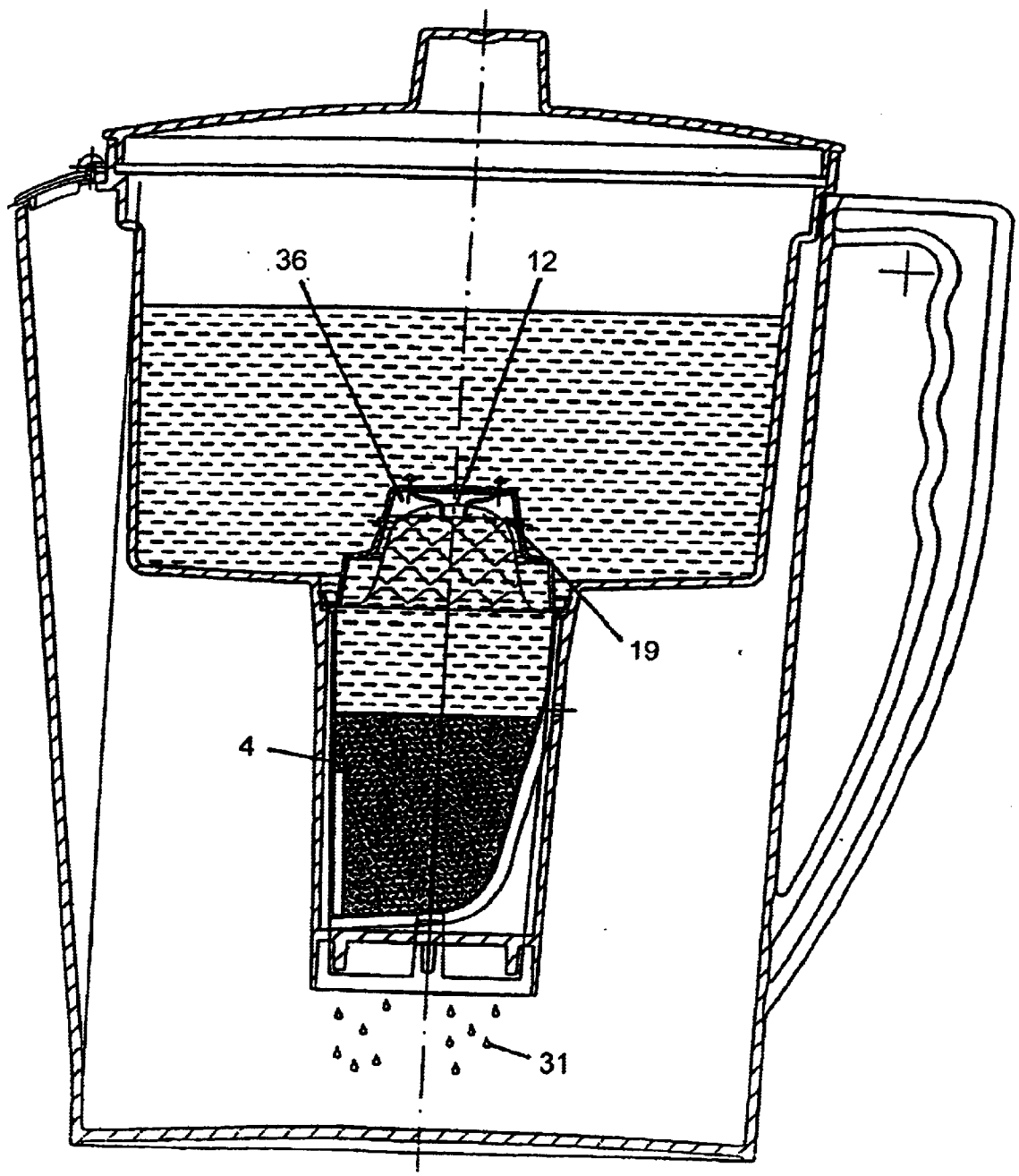
Figure 15:
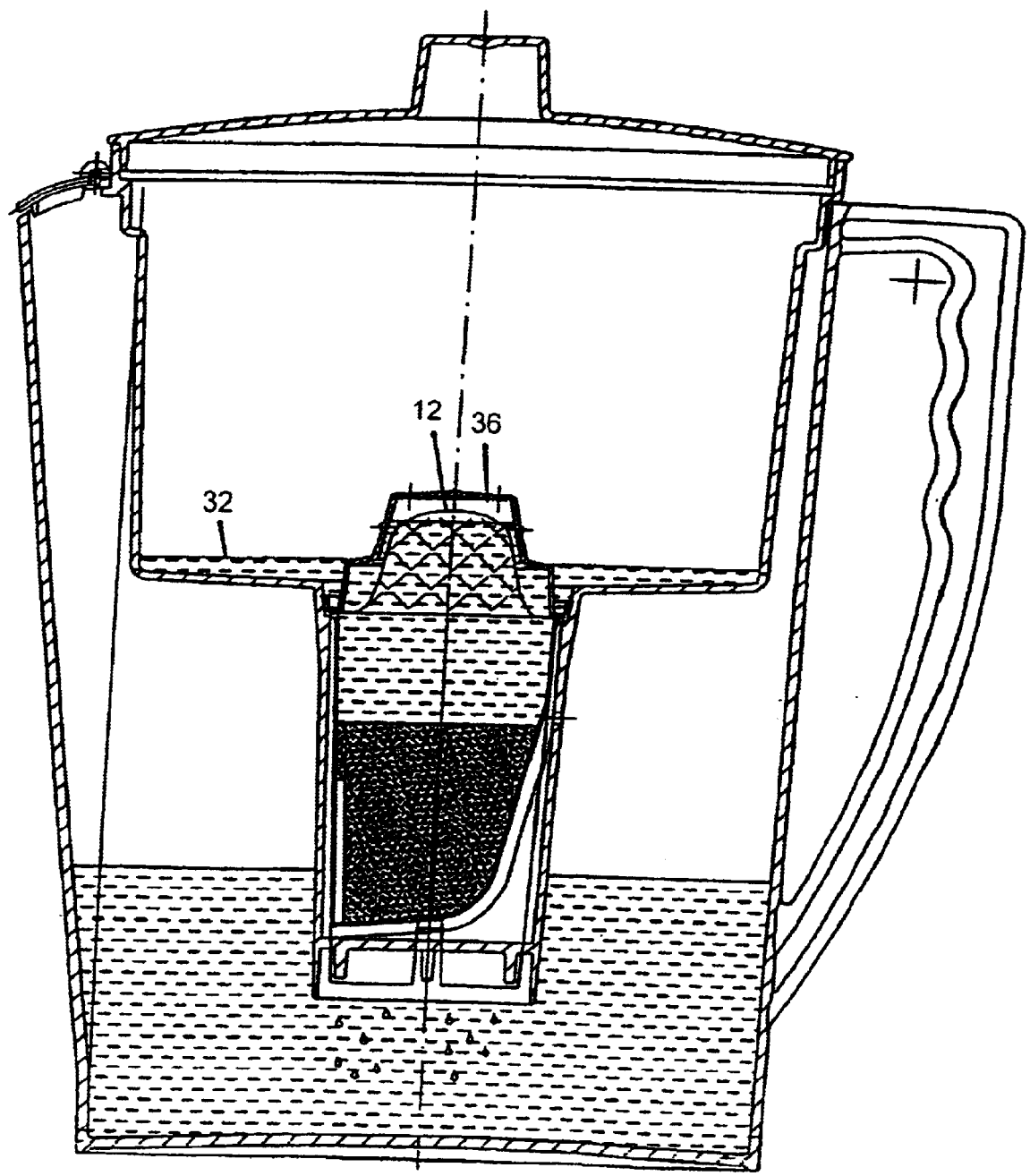
Figure 16:
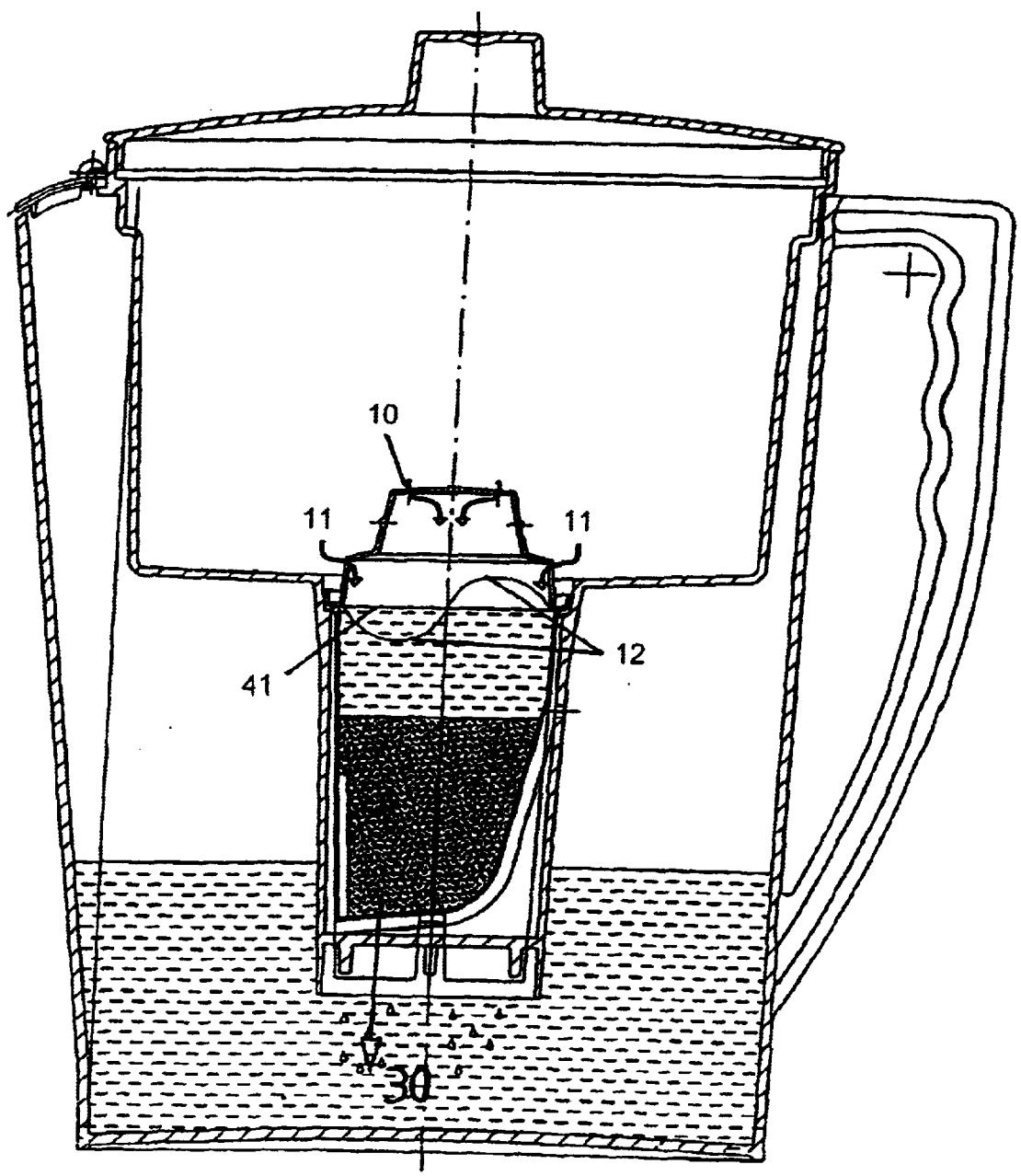
Figure 17:
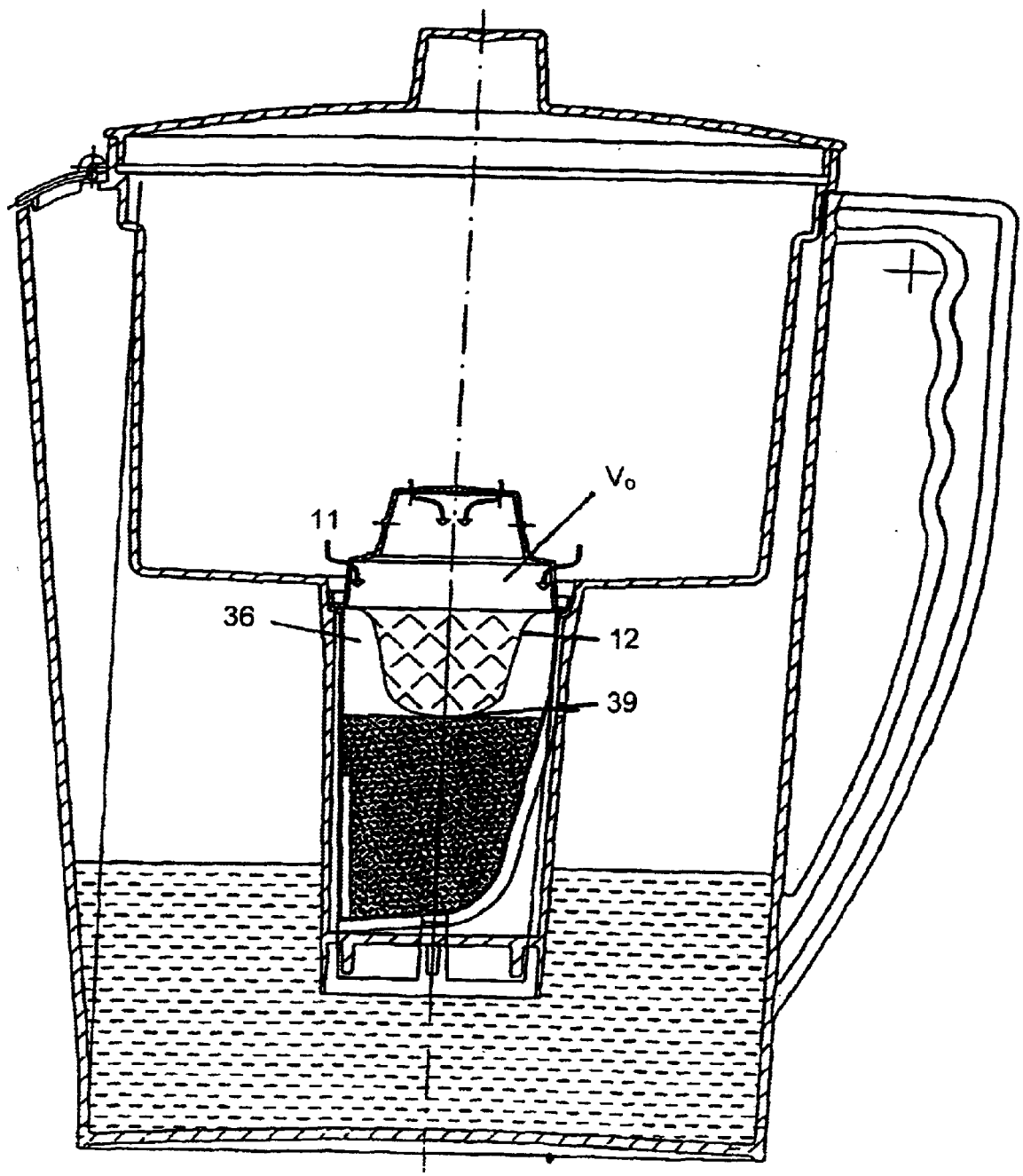
Figure 18:
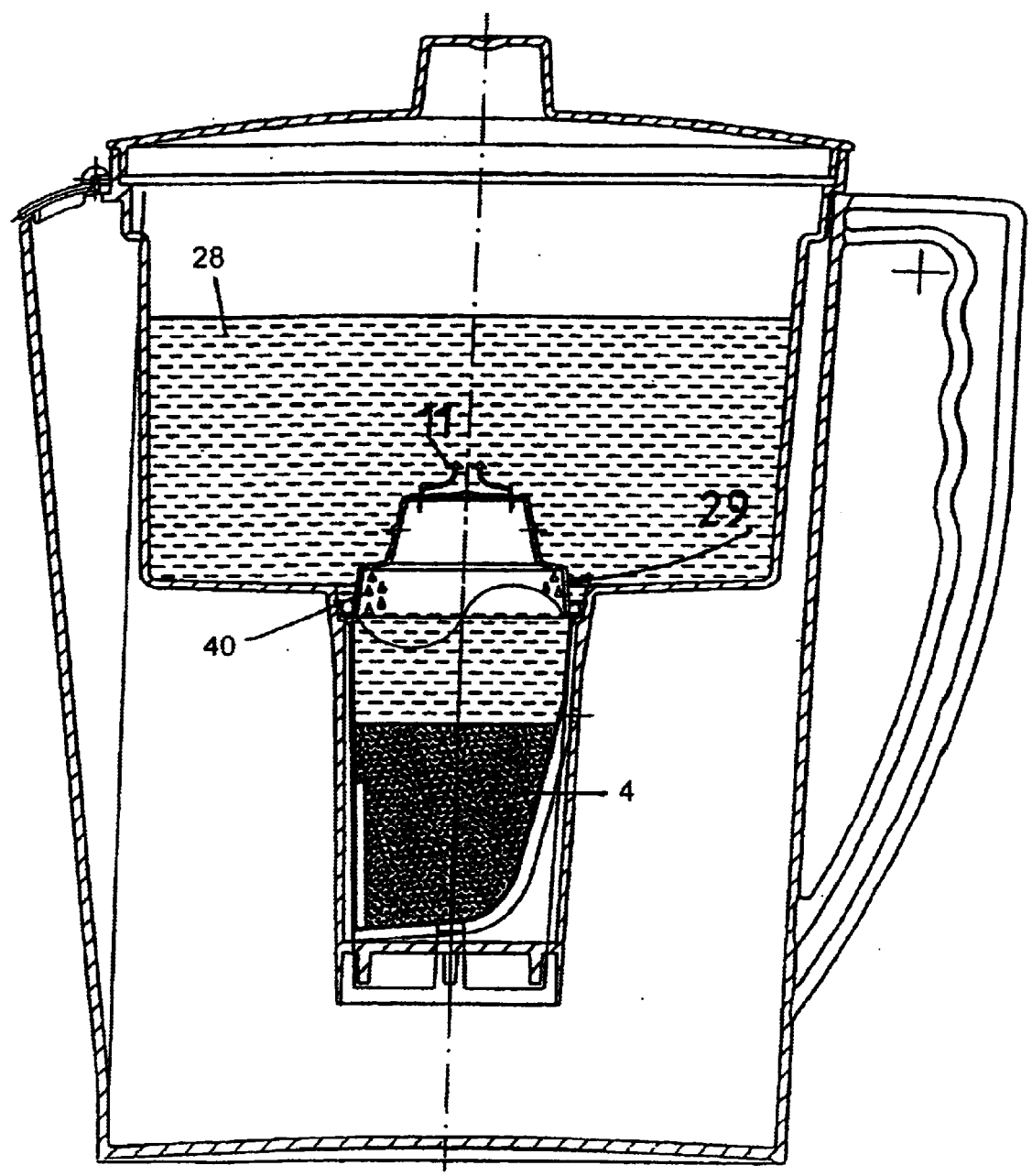

Further advantages, features and possible uses of the present invention can be seen from the following description of preferred embodiments in combination with the attached drawings. In these, FIGS. 1 to 11 show the first embodiment, that is to say:

FIG. 1 a cross-section view through a filtration device according to the invention arranged in the entire system, this filtration device being the filtration cartridge itself and an operating state after about one second being shown, FIG. 2 an enlargement of the cross-section view of the filtration device (filtration cartridge) according to the invention in the same operating slate as in FIG. 1, FIG. 3 a similar diagram to that in FIG. 1, but in the operating state of filling after, for example, 3 seconds, FIG. 4 a similar view, but in the operating state of emptying, FIG. 5 again a similar view and in the operating state of emptying, FIGS. 6 to 10 another embodiment in which the filtration device is filled to only just about two thirds with filtration material, which figures show FIG. 6 a sectional diagram as in FIG. 1 in the operating state of filling after, for example, 2 seconds, FIG. 7 the same sectional diagram as in FIG. 6, but in the operating state of filling after, for example, 4 seconds, FIG. 8 a similar diagram to FIG. 7, but in the operating state of filling after, for example, 6 seconds, FIG. 9 a similar cross-section diagram, but in the operating state of emptying, similar to that in FIG. 4 for the other embodiment, FIG. 10 again a similar cross-section diagram of the filtration device in the operating state of emptying (in the second embodiment with an only partly filled filtration beaker), similar to the diagram of FIG. 5 for the first embodiment and FIG. 11 an enlarged cross-section diagram of a lid of another embodiment of the filtration device, while for the second embodiment the figures show:

FIG. 12 a cross-section view through a filtration device arranged in an entire system in the form of a filtration cartridge in a first operating state, FIG. 13 an enlarged cross-section view of the filtration device in the form of a cartridge of FIG. 12, FIG. 14 a cross-section view of the entire system in a second operating state, FIG. 15 a cross-section view of the entire system in a third operating state, FIG. 16 a cross-section view of the entire system in a fourth operating state, FIG. 17 a cross-section view of the entire system in a fifth operating state and FIG. 18 a cross-section view of the entire system in a sixth operating state.

The filtration device, generally designated 1, for liquids according to the two embodiments of the invention sits in the lower, sheath-like part 20 of a funnel 21. The funnel is inserted at the top into a collecting jug 22, which has on its rear side the handle 23 and on its front side the pouring spout 24 with a spout cover 25. A slightly curved covering part 26 is mounted on the funnel 21 at the top, in order to prevent dust particles and the like from falling into the inside of the funnel 21. This covering part 26 can be removed manually via the raised part 27. The apparatus shown in total in FIGS. 1 and 12 is initially filled with untreated water 28, which flows downwards into the filtration device 1 in accordance with the curved arrows 29, to leave this at the bottom according to arrow 30 and to be collected in the collecting jug 22.

The filtration device designated generally with 1 is now explained in detail with the aid of FIGS. 2 and 13.

The funnel 21 with the sheath 20 positioned centrally at the bottom accommodates the filtration device 1, chiefly the filtration beaker 2, the base 3 of which has outlet openings, not shown here, for the liquid, the water, so that this can flow out downwards along arrow 30, driven by gravity. The cross-section here is positioned centrally through the filtration device 1, so that the outlet openings, which are not shown, are to be imagined in front of and behind the plane of the section. The filtration beaker 2 is filled with filtration material 4. In the upper region, the filtration device 1 comprises the lid 5. This is enlarged in FIG. 11 in the case of the first embodiment, and is to be regarded as shown for a further other embodiment. Along the lower edge 6 of the lid 5, this is connected to the upper edge of the filtration beaker 2, so that the upper edge of the filtration beaker 2 coincides with the lower edge 6 of the lid 5.

The gravity operation of the filtration device functions best when the longitudinal axis 7 of the filtration device 1, which coincides with the longitudinal axis of the funnel sheath 20, lies in the vertical, i.e. in the perpendicular. This is easily achieved by placing the collecting jug 22 on a horizontal surface. The positions "top" and "bottom" arise as a result. It is seen that the lid 5 is provided at the top and the filtration beaker 2 is provided further below in the filtration device 1. Through the upper edge of the filtration beaker 2 and the lower edge 6 of the lid 5, a horizontal plane can be imagined in the assembled state of FIGS. 2 and 13, which separates the volume of the filtration material 4 from the inner volume $V_i$ or $V_d$ inside the lid. The total space within the lid up to this plane through its lower edge, which can be clearly seen in FIG. 11, is this inner volume $V_i$ or $V_d$ of the lid 5.

The lid 5 is provided on the circumference in its lower widened part with four slit-like inlet openings 8 for the water (the liquid). The four inlet openings are each provided at a distance from one another with a displacement by 90° on the circumference of the lid 5. The part ring-shaped area of the widened lower part of the lid 5 in between in each case is moreover closed.

At the top, the upper, narrower part of the lid 5 is connected like an inverted beaker, and the two venting openings 10 for escaping air arranged at a distance from one another are seen in the upper wall 9 of the lid 5. The curved arrows 11 illustrate the air flowing out: through these venting openings 10, preferably while liquid is flowing in through the slits 8.

Between the filtration beaker 2 and the lid 5 is located a sieve-like fabric, designated 12, which in the second embodiment according to FIGS. 13 to 18 divides the inner volume $V_i$ of the filtration beaker into the two part volumes $V_o$ and $V_u$. In the first embodiment of FIGS. 1 to 10 shown and in the operating states of FIGS. 12 to 15, this has the shape of a bell. This bell is the formed part 13 protruding into the inner volume $V_i$ or $V_d$ of the lid 5. En the embodiments shown in FIGS. 1 to 10, the entire textile fabric 12 is curved such that it directly becomes the protruding formed part 13, because the entire textile fabric 12 protrudes upwards into the inner space of the lid 5. In another operating state in the second embodiment, such as is shown, for example, in FIG. 17, the sieve-like fabric 12 is "folded" or has sunk downwards on to the filtration material 4 because of its only very low intrinsic stability, and assumes again, depending on the fill volume of the filtration material 4, at the most its previously described bell shape as a mirror image around the lower edge 6 of the lid 5. In FIGS. 16 and 18, an intermediate state of the textile fabric 12 between its upper and low extreme position is shown.

In the first embodiment of the invention according to FIGS. 1 to 11, the part of the textile fabric 12 located the furthest away from the filtration beaker 2 arranged further below is designated 14. This is the region around the highest point of the fabric 12 or of the protruding formed part 13. This upper part of the fabric located away is clearly visibly at a distance from the inner surface of the upper wall 9 of the lid 5. The textile fabric 12 protrudes upwards in the form of the formed part 13 into the lid 5 such that there is air both on the inside and on the outside, i.e. on both sides of the textile fabric 12 in the upper part 14 thereof. Various air spaces are shown here, corresponding to the different operating states, and in FIGS. 1 and 2 the still quite large (depending on the filling state) air space is designated a. This air space a of FIGS. 1 and 2 is both inside and outside the textile fabric 12 or the protruding formed part 13.

The highest ends 15 of the inlet openings 8 for the water are connected to one another by a horizontal plane 16. These circumstances illustrate that above this horizontal plane 16 through the highest ends 15 of the inlet openings 8 are arranged both the venting openings 10 located right at the top in the upper wall 9 of the lid 5, and the upper part 14 of the fabric 12.

In the embodiment of FIG. 11, the textile fabric 12 can indeed be constructed as one piece, but a particular embodiment is shown here in which the textile fabric is in two pieces, that is to say comprises a ring-shaped sieve formed body 17 which runs around the entire jacket surface, which is in the shape of a truncated cone, of the lower lid part and as a result is arranged behind the inlet openings 8 for liquid. Separately from this ring-shaped sieve formed body 17 of the fabric 12, a disc-shaped sieve formed body 18 of the fabric 12 is positioned at the top at a distance from the upper wall 9 of the lid 5, the disc-shaped sieve formed body 18 being substantially flat and taking over the sieve function for the venting openings 10. Both sieve formed bodies 17 and 18 of the embodiment of FIG. 1I can be welded on to the lid 5.

The operation of the first embodiment according to FIGS. 1 and 3 to 5 will first be described. This embodiment is characterized in that the filtration beaker 2 is filled completely with filtration material 4, for example thus predetermines a material volume of 140 ml. In the operating state of FIG. 1, the funnel 21 is filled with water. The water flows through the four inlet openings 8 in accordance with the curved arrows 29 into the inside of the filtration cartridge (filtration device) 1. Above the filtration material 4 the water level 19 now builds up, and has reached the height shown in FIG. 1 after about 1 second. At the same time, the air escapes according to the curved arrows 11 upwards through the venting slits 10. This is that air which is above the filtration material 4. Since the air pressure inside the filtration cartridge 1 is greater than the pressure of the untreated water 28 outside the filtration cartridge 1, no water can run into the filtration cartridge from the outside through the venting openings 10.

It can be seen that the upper part 14 of the textile fabric 12 is arranged above the inlet openings 8, i.e. above the horizontal plane 16 through the highest ends 15 of the inlet openings 8. Consequently, liquid cannot flow immediately over the upper half of the textile fabric in the bell shape shown here. This has the effect of optimum venting within the cartridge-like filtration device 1.

The operating state of filling is indeed still shown in FIG. 3, but here after about 3 seconds since the start. The water level 19 in the lid 5 is now higher compared with the level of FIGS. 1 and 2. This water level 19 extends both inside the textile fabric 12 and outside this, but inside the lid 5. The position of the water level 19 in FIG. 3 has risen to about 3 mm below the upper wall 9 of the lid 5. The much smaller air space b of FIG. 3 is seen. Underneath in the filtration beaker 2, the filtration agent 4 is meanwhile also flooded completely with water. The water emerges at the bottom, in the form of the drops 31 shown, from the filtration device 1, which is also constructed at the bottom with an injection-moulded fabric. The water is collected at the bottom in the collecting jug 22.

FIG. 4 shows the operating state of emptying, because the water level 32 in the funnel 21 has fallen to a considerably lower level compared with FIGS. 1 to 3. However, the water level 19 in the lid 5 is unchanged compared with the state in FIG. 3 (filling). As a result of the fact that the upper venting openings 10 in the upper wall 9 of the lid 5 are no longer covered with water, because the water level 32 lies below the level of the upper wall 9, the air space b (FIG. 3) can decrease in size. While the distance of the water level 19 in the lid is also shown as 3 mm in FIG. 4, this distance could be decreased to 1 mm. However, this is not always the case. In FIG. 4, this decrease in the size of the air space is therefore not shown. FIG. 5 in turn shows the operating state of emptying, but the emptying has already progressed further here compared with the state of FIG. 4. The water level 32' in the funnel 21 is lower compared with the water level 32 in FIG. 4. The water level 32' is now already below the highest end 15 of the water inlet opening 8 in the lower part of the lid 5. As a result, air can enter into the inner volume $V_i$ of the lid 5 from the space in the funnel 21 not only through the venting openings 10 but also through the upper part of the inlet openings 8 for the water, i.e. both inside and outside the textile fabric 12. Due to this additional entry of air through the openings 10 and in particular additionally the openings 8, a rapid lowering of the water level 32' within the lid 15 is effected. However, FIG. 5 shows that state in which the water level within the lid 5 is already at the same level as the water level 32' in the funnel 21 outside the lid.

FIGS. 6 to 10 show a second embodiment of the filtration device 1 according to the invention, in which the filtration beaker 2 is only filled to half to two thirds with filtration material 4. Assuming that in the embodiment of FIGS. 1 to 5 the fill volume of filtration material is 140 ml, the fill volume in the second embodiment according to FIGS. 6 to 10 is 95 ml.

FIG. 6 again shows the operation of filling after 2 seconds from the start of filling. The funnel 21 is again filled with water up to the level 32. The water shown by water drops 33 in the filtration device 1 runs through four inlet openings 8 into the inside of the filtration device 1 constructed as a filtration cartridge. Due to filling with only 95 ml of filtration material 4, this reaches a fill level 34 in the filtration beaker 2. The water level 32" builds up in the filtration beaker 2 above this fill level 34. At the same time, the air above the filtration material 4 in the filtration device 1 escapes through the upper venting openings 10 in the upper wall 9 of the lid 5 according to the arrows 11.

The pressure in the air space c in the upper part of the filtration beaker 2 and in the lid 5 is greater than the water pressure outside the lid 5. As a result, no water can flow into the lid from the outside through the venting openings 10 through the upper wall 9 of the lid 5. Since the majority of the textile fabric 12, i.e. the bell-shaped protruding formed part 13, moreover lies above the inlet openings 8 for water, liquid cannot immediately "flow over" the upper part of the textile fabric 12. As a result, optimum venting is effected within the cartridge-like filtration device 1.

FIG. 7 shows the operating state of filling after about 4 seconds. Due to the small fill volume of only about 95 ml, emergence of water from the filtration beaker 2 can already occur, depending on how dry/moist the filtration material 4 is, while the water level 32" builds up in the sieve beaker and then above this in the lid 5. This cannot be seen in FIG. 7.

In the space above the fill level 34 of the filtration material 4, the water level builds up from the bottom upwards, this being shown in FIG. 7 here at the position of the water level 32". The upper part of the textile fabric 12 or of the protruding formed part 13 is not touched by the water entering through the inlet openings 8. The part 14 located the furthest away from the filtration beaker 2, i.e. the highest point 14 of the protruding formed part 13 of the fabric 12, thus has a small air space on both sides, so that a passage from air to air and therefore a good discharge of air exists from inside the fabric 12 to the outside of this (all inside the lid 5). Optimum venting therefore occurs inside the cartridge-like filtration device 1.

FIGS. 8, 9 and 10 are to be compared with FIGS. 3, 4 and 5 of the first embodiment. Apart from the larger amount of filtration material 4 in the first embodiment, the operating states are otherwise the same.

Finally, FIG. 11 of the first embodiment shows the lid 5, in the upper region of which is incorporated and fixed a hydrophobic, disc-shaped sieve formed body 18, as part of the fabric 12, at a distance of 2–10 mm, preferably 3–6 mm, from the upper wall 9 of the lid 5. A ring-shaped sieve formed body 17 of the textile fabric 12 with hydrophilic properties is located behind the inlet openings 8 in the lower region of the lid. The same action principle as in the embodiments of FIGS. 1 to 10 can also be achieved with the dome of FIG. 11.

The second embodiment according to FIGS. 12 to 18 will now be described.

The edges of the sieve-like fabric 12 form a reference plane provided with the reference number 35. The part of the fabric 12 located the furthest away from the reference plane 35 in the first extreme position of the sieve-like formed body is designated with the reference number 37. This is the region in the vicinity of the highest point of the fabric 12. This part of the fabric 12 located away and folded upwards can be clearly seen to be arranged such that there is a distance between the inner surface of the upper wall 9 of the lid 5 and the region 37 of the fabric 12. This ensures that the fabric 12 protrudes upwards into the lid 5 !such that there is air both inside and outside, i.e. on both sides of the textile fabric 12, in the upper part 37 thereof. For illustration, in FIGS. 12 and 13 the hollow space consisting of air within the filtration cartridge has been designated 36. The size of the enclosed air space depends on the operating state of the filtration device, as will also become clear in the following. As can be clearly seen from FIGS. 12 and 13, the air space 36 in this operating state is both inside and outside the textile fabric 12.

The highest ends 38 of the inlet openings 8 for water are joined to one another by a horizontal plane 16. These circumstances illustrate that both the venting openings 10 located right at the top in the upper wall 9 of the lid 5 and the upper part 37 of the fabric 12 are arranged above this horizontal plane 16 through the highest ends 38 of the inlet opening 8.

The operation of this second embodiment of the filtration device according to the invention of FIGS. 12 to 18 is described in the following. To start the filtration operation, untreated water 28 is first introduced into the funnel 21. This operating state is shown in FIGS. 12 and 13. The water flows through the four inlet openings 8 in accordance with the curved arrows 29 into the inside of the filtration device (filtration cartridge) 1. A water level 19 is established above the filtration material 4 and rises rapidly at the start of the filtration operation. About three seconds after the untreated water 28 has been introduced into the funnel 21, the water level 19 reaches the height shown in FIG. 12. As a result, a slight increased pressure arises in the filtration cartridge 1, which ensures that the air originally contained in the filtration cartridge escapes upwards through the venting slits 10 in accordance with the curved arrows 11. Due to the fact that the inlet openings are arranged below the venting openings 10, the air pressure inside the filtration cartridge 1 is greater than the hydrostatic pressure of the untreated water 28 outside the filtration cartridge 1 at the height of the venting openings 10. Thus no water can run from the outside through the venting openings 10 into the filtration cartridge.

As already mentioned, in the first extreme position of the sieve-like fabric, the upper part 37 is arranged above the inlet openings 8, i.e. above the horizontal plane 16 determined by the highest ends 38 of the inlet openings 8. In this operating state also, untreated water therefore does not flow completely over the sieve-like fabric. Rather, the upper part 37 of the textile fabric 12 remains inside the air space 36, so that a passage of air to air can remain here. The upper part 37 of the sieve-like formed body 12 effects optimum venting inside the cartridge-like filtration device 1.

The operating state shown in FIGS. 12 and 13 is achieved directly after the start of filtration if the sieve-like fabric 12 is completely dry. A further operating state of the filtration device according to the invention is shown in FIG. 14. In the situation shown, about five seconds have elapsed since the start of the filtration operation, i.e. a situation which arises about 2 seconds in time after the situation shown in FIG. 12 is described in FIG. 14. It can be clearly seen that the water level 19 in the lid 5 has now risen compared with the water level of FIGS. 12 and 13. This water level 19 extends through the sieve-like fabric 12, so that it runs both in the inside of the sieve-like fabric 12 and outside of this, but inside the lid 5, i.e. in this state also an air cushion or air space exists, which likewise carries the designation 36 in this figure. The position of the water level 19 in this operating state has risen to a level about 3 mm below the upper wall 9 of the lid 5. The air space 36 has decreased in size considerably compared with the air space 36 of FIGS. 12 and 13. In this operating state the filtration agent 4 is penetrated completely with water, so that in the lower region water in the form of the drops shown with the reference number 31 emerges from the filtration device 1 from the outlet openings. The water is collected in the collecting jug 22.

A further operating state of the filtration device according to the invention is to be seen in FIG. 15. The funnel 21 has since run virtually empty. The water level 32 in the funnel 21 has therefore fallen to a considerably lower level compared with FIGS. 12 and 14. The water level 19 in the lid 5 is virtually unchanged compared with the state in FIG. 14. Due to the fact that the upper venting openings 10 in the upper wall 9 of the lid 5 are no longer covered with water, because the water level 32 is below the level of the upper wall 9, an air to air passage arises at the venting openings, so that the air space 36 can briefly decrease in size further, depending on the speed of filtration. However, at least a small air space 36 remains in all the operating states. Since the further narrowing described for the air space cannot always be observed, this is not shown in FIG. 15.

Finally, FIG. 16 shows an operating state in which the filter 21 is already completely emptied. In this state, untreated water is only still inside the filtration cartridge 1.

The water level 41 in the filtration beaker 1 has fallen significantly compared with the water level 32 in FIG. 15. In this operating state the water level 41 is already below the highest end 38 of the water inlet openings 8 in the lower part of the lid 5. As a result, air from the funnel volume of the funnel 21 can enter into the inner volume $V_d$ of the lid 5 both through the venting openings 10 and through the inlet openings 8. The falling of the water level 41 is thereby accelerated. The textile fabric 12 is produced such that it has a hydrophilic action. All surfaces of the textile fabric 12 which come into contact with the water to be filtered are consequently wetted. In conjunction with the surface tension known for liquids, the wetting has the effect of the formation of a film of moisture within the pores of the textile fabric 12. In fabric technology "sail formation" is referred to here.

The individual pores of the sieve-like woven fabric are virtually sealed off by this sail formation. These sails can in general be retained for a relatively long period of time of, for example, about 30 minutes, even after the water has flowed out completely, so that the textile fabric 12 forms a closed bell which counteracts the circulation of air in the filtration cartridge.

If the water level 41 in the filtration beaker 1 continues to fall in the direction of the upper edge of the filling material, a reduced pressure arises underneath the textile fabric, so that the flexible sieve-like fabric 12 is caused to virtually collapse and is carried downwards in the direction of flow with the falling water level 41. This state is shown in diagram form in FIG. 16.

It goes without saying that in some embodiments the sieve-like formed body 12 can already fall during an earlier operating state. Although this delays the filtration operation somewhat, the object according to the invention is then also achieved.

Finally, FIG. 17 shows the final state after the end of the filtration operation. The textile fabric 12 is now curved downwards, so that it comes into contact with the surface of the filtration material 4. The contact point, which can also be a contact area, depending on the fill height of the filtration material, carries the reference number 39 here.

On the basis of this contact 39, a sufficiently large number of sails are broken open from the pores of the sieve-like fabric 12, so that a free cross-section arises from the sum of the areas of the open pores for unimpeded passage of a residual flow of air and water into the filling material 4.

It is clear that the change in volume, arising due to the moving sieve-like fabric, of the part volume in which the filtration material is located should be matched to the expansion of the filtration material on the basis of variations in moisture.

Finally, FIG. 18 shows again the start of the filtration operation. FIG. 18 substantially differs from FIG. 12 in that in FIG. 18 the sieve-like fabric 12 is still wet, so that a majority of the pores of the textile fabric 12 are closed by sail formation.

The textile fabric 12 is initially still in contact with the filtration material 4, as shown in FIG. 17. Water 40 flows through this contact point 39 into the filtration material 4 until an air-tight barrier arises due to the increased moisture content, this barrier preventing the residual air in the filtration unit 1 from flowing out through the filtration material 4 through the outlet openings.

An increased pressure consequently arises below the sealed-off sieve-like fabric 12 from FIG. 17. The sieve-like fabric 12 is forced upwards by this increased pressure, as can be seen in FIG. 18, and returns to the first extreme position shown in FIG. 12.

Due to the high increase in the hydrostatic pressure of the untreated water in the filter 21, the sails in the sieve-like fabric 12 are broken open, so that the operating state which has already been described in FIG. 12 is substantially re-established. The sequence of operating states described is now repeated.

List of Reference Symbols
1 Filtration device
2 Filtration beaker
3 Base of the filtration beaker
4 Filtration material
5 Lid
6 Lower edge of the lid 5
7 Longitudinal axis of the filtration device
8 Inlet openings for liquid
9 Upper wall of the lid
10 Venting opening
11 Curved arrow for the direction of flow of the air
12 Sieve-like fabric
13 Protruding formed part
14 The upper part of the textile fabric located away
15 Highest end of the inlet opening 8
16 Horizontal plane through 15
17 Ring-shaped sieve formed body of the textile fabric
18 Disc-shaped sieve formed body of the textile fabric
19 Water level in the lid 5
20 Sheath-like part of the funnel
21 Funnel
22 Collecting jug
23 Handle of the collecting jug
24 Pouring spout
25 Spout cover
26 Curved covering part
27 Raised part
28 Untreated water
29 Curved arrow (direction of inflow)
30 Arrow (direction of outflow)
31 Emerging water drops
32 Water level in the funnel 21 top
32' Water level in the funnel 21 bottom
32" Water level in the filtration beaker
33 Water drops in the filtration device
34 Fill level in the filtration beaker
35 Reference plane
36 Air space
37 The part of the sieve-like fabric located the furthest away from the reference plane
38 Highest end of the inlet opening
39 Contact point or contact area
40 Untreated water entering in
41 Water level in the filtration beaker
a Larger air space in the lid according to FIG. 1
b Small air space in the lid according to FIG. 3
c Air space in the filtration device according to FIG. 6
$V_i$ Inner volume of the lid
$V_u$ Lower part volume
$V_o$ Upper part volume

What is claimed is:
1. A filtration device for liquids comprising a filtration beaker which is filled with filtration material, said filtration beaker including a base which has at least one sieve-like outlet opening for the liquid, and a lid which predetermines an inner volume, said lid being provided with at least one inlet opening for the liquid and one venting opening for escaping air, said lid being connected to the filtration beaker in a liquid-tight manner, a sieve-like textile fabric being arranged between the filtration beaker and the lid such that the sieve-like, textile fabric has at least one formed part protruding into the inner volume of the lid such that during the predominant part of the operation of the filtration device there is air on both sides of that portion of the textile fabric located the furthest away from the filtration beaker.

2. A filtration device according to claim 1, wherein that portion of the textile fabric located furthest away from the filtration beaker in the lid and the venting opening are located above the highest end of the inlet opening.

3. A filtration device according to claim 1, wherein the formed portion of the textile fabric protruding into the inner volume of the lid is at least partly curved.

4. A filtration device according to claim 3, wherein the protruding formed portion of the textile fabric has the shape of a spherical cap and is fixed in the lower, outer region to the upper edge of the filtration beaker and the lower edge of the edge.

5. A filtration device according to claim 1, wherein the textile fabric is a woven fabric, knitted fabric, nonwoven or shaped part of plastic, and the pore size of the fabric is preferably in the range of from about 50 $\mu$m to about 300 $\mu$m and preferably from about 80 $\mu$m to about 200 $\mu$m.

6. A filtration device according to claim 1, wherein the ratio of the fluid cross-section areas A:B:C:C is approximately equal to 1:2:10:20, with a tolerance of about ±50%, where A=the free total passage cross-section of the venting openings in the lid;

B=the free total passage cross-section of the inlet openings for the liquid in the lid;

C=the projected free, total passage cross-section, for venting of the pores of the part of the fabric at the top in the lid; and D=the free, total passage cross-section for liquid through the pores of the ring-shaped, lower jacket part of the fabric.

7. A filtration device according to claim 1, in that wherein the portion of the fabric located in the lid is arranged at a distance from the upper wall of the lid.

8. A filtration device according to claim 1, wherein the inner volume provided by the textile fabric is $\geq 5\%$ of the fill volume of the filtration material in the filtration breaker.

9. A filtration device according to claim 1, wherein the portion of the fabric in the lid has a hydrophobic or hydrophobized material at least in the upper region.

10. A filtration device according to claim 1, wherein the lower part of the textile fabric has hydrophobic parts in the region of the inlet openings for passage of the liquid.

11. A filtration device for liquids comprising a filtration chamber which is at least partly filled with filtration material, said filtration chamber including walls, at least one inlet and one outlet opening for the liquid, a sieve-like formed body located between the inlet and outlet opening such that, together with the walls of the filtration chamber it forms a volume ($V_u$) in which the filtration material is located, and wherein the sieve-like formed body is at least partly movable, so that it can occupy at least first and second positions and intermediate positions in between, the volume being reduced by the difference in volume on passage of the sieve-like formed body from the first to the second position.

12. A filtration device according to claim 11, wherein the sieve-like formed body comprises a fabric.

13. A filtration device according to claim 12, wherein the area of a reference plane through the edge of the fabric is smaller than the actual area of the fabric.

14. A filtration device according to claim 11, wherein the filtration chamber has at least one venting opening for escaping air, which is arranged on the same side of the sieve-like formed body as the inlet opening.

15. A filtration device according to claim 11, wherein the difference in volume is at least 1% of the fill volume of the filtration material in the filtration chamber.

16. A filtration device according to claim 11, wherein the difference in volume is at least 1% of the volume of the volume $V_u$.

17. A filtration device according to claim 11, wherein the sieve-like formed body comes into contact with the correspondingly established surface of the filtration material and/or a further structural component in at least said second position.

18. A filtration device according to claim 13, wherein a part of the fabric located away from the reference plane does not touch the wall of the filtration chamber in said first position.

19. A filtration device according to claim 11, wherein the filtration device is gravity-driven, at least a part of the formed body being higher in said first position of the formed body than the same part in said second position.

20. A filtration device according to claim 19, wherein when said sieve-like formed body is in said first position, the part of the fabric located away from the reference plane and the venting opening are arranged above the highest end of the inlet opening.

21. A filtration device according to claim 12, wherein the textile fabric is selected from the group consisting of a woven fabric, knitted fabric, fibrewoven fabric, nonwoven or shaped part of plastic, and the pore size of the fabric is in the range of from 50 $\mu$m to 300 $\mu$m.

22. A filtration device according to claim 19, wherein the ratio of the fluid cross-section areas A:B:C:D is approximately equal to 1:2:10:20, with a tolerance of about ±50%, where A=the free total passage cross-section of the venting openings in the filtration chamber, B=the free total passage cross-section of the inlet openings for the liquid in the filtration chamber;

C=the free, total passage cross-section, which serves for venting, of the pores of the fabric in said first position; and D=the free, total passage cross-section for liquid through the pores of the substantially ring-shaped lower part of the fabric in said first position.

23. A filtration device according to claim 11, wherein the sieve-like formed body has hydrophilic parts.

24. A filtration device according to claim 21, wherein the thread thickness of the textile fabric is between 5 and 100 $\mu$m.

25. A filtration device according to claim 11, wherein the formed body is produced from flexible and/or elastic material.

* * * * *

UNITED STATES PATENT AND TRADEMARK OFFICE
CERTIFICATE OF CORRECTION

PATENT NO. : 6,841,067 B1
DATED : January 11, 2005
INVENTOR(S) : Hofmann et al.

It is certified that error appears in the above-identified patent and that said Letters Patent is hereby corrected as shown below:

Column 21,
Line 38, "7. A filtration device according to claim 1, in that wherein" should read
-- 7. A filtration device according to claim 1, wherein --; and Column 22,
Line 44, "openings in the filtration chamber," should read -- openings in the filtration chamber; --.

Signed and Sealed this

Seventh Day of June, 2005

JON W. DUDAS
*Director of the United States Patent and Trademark Office*